(12) United States Patent
Baumann et al.

(10) Patent No.: US 9,389,933 B2
(45) Date of Patent: Jul. 12, 2016

(54) FACILITATING SYSTEM SERVICE REQUEST INTERACTIONS FOR HARDWARE-PROTECTED APPLICATIONS

(75) Inventors: Andrew A. Baumann, Redmond, WA (US); Galen C. Hunt, Bellevue, WA (US); Marcus Peinado, Bellevue, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 0 days.

(21) Appl. No.: 13/323,562

(22) Filed: Dec. 12, 2011

(65) Prior Publication Data

US 2013/0152209 A1 Jun. 13, 2013

(51) Int. Cl.
| G06F 7/04 | (2006.01) |
| G06F 9/54 | (2006.01) |
| G06F 21/53 | (2013.01) |
| G06F 21/60 | (2013.01) |
| G06F 21/74 | (2013.01) |

(52) U.S. Cl.
CPC .............. *G06F 9/545* (2013.01); *G06F 21/53* (2013.01); *G06F 21/60* (2013.01); *G06F 21/602* (2013.01); *G06F 21/74* (2013.01)

(58) Field of Classification Search
USPC ....................................... 726/26–30; 713/187
See application file for complete search history.

(56) References Cited

U.S. PATENT DOCUMENTS

| 4,874,164 A | 10/1989 | Miner et al. |
| 5,754,830 A | 5/1998 | Butts et al. |
| 5,815,686 A | 9/1998 | Earl et al. |
| 5,819,091 A | 10/1998 | Arendt et al. |
| 5,926,631 A | 7/1999 | McGarvey |
| 6,357,003 B1 | 3/2002 | Zarrin et al. |
| 6,546,425 B1 | 4/2003 | Hanson et al. |
| 6,578,054 B1 | 6/2003 | Hopmann et al. |
| 6,665,731 B1 | 12/2003 | Kumar et al. |
| 6,668,376 B1 | 12/2003 | Wang et al. |
| 6,721,288 B1 | 4/2004 | King et al. |
| 6,813,670 B1 | 11/2004 | Yao et al. |
| 6,874,066 B2 | 3/2005 | Traversat et al. |
| 6,876,996 B2 | 4/2005 | Czajkowski et al. |

(Continued)

FOREIGN PATENT DOCUMENTS

| CN | 1380610 | 11/2002 |
| CN | 1906560 | 1/2007 |

(Continued)

OTHER PUBLICATIONS

Gregg et al., Overview of IBM zEnterprise 196 I/O subsystem with focus on new PCI Express infrastructure, IBM J. Res. & Dev. vol. 56 No. 1/2 Paper Jan. 8/Mar. 2012, pp. 8:1-8:14.*

(Continued)

*Primary Examiner* — Roderick Tolentino
(74) *Attorney, Agent, or Firm* — Alin Corie; Sandy Swain; Micky Minhas (57) ABSTRACT

Described herein are implementations for providing a platform adaptation layer that enables applications to execute inside a user-mode hardware-protected isolation container while utilizing host platform resources that reside outside of the isolation container. The platform adaptation layer facilitates a system service request interaction between the application and the host platform. As part of the facilitating, a secure services component of the platform adaptation layer performs a security-relevant action.

20 Claims, 5 Drawing Sheets

(56) References Cited

U.S. PATENT DOCUMENTS

| | | | |
|---|---|---|---|
| 7,028,308 B2 | 4/2006 | Kim | |
| 7,065,607 B2 | 6/2006 | England et al. | |
| 7,185,359 B2 | 2/2007 | Schmidt et al. | |
| 7,272,782 B2 | 9/2007 | Sneh | |
| 7,275,105 B2 | 9/2007 | Bloch et al. | |
| 7,287,259 B2 | 10/2007 | Grier et al. | |
| 7,293,107 B1 | 11/2007 | Hanson et al. | |
| 7,334,122 B2 | 2/2008 | Burokas et al. | |
| 7,421,579 B2 | 9/2008 | England et al. | |
| 7,444,337 B2 | 10/2008 | Zhou et al. | |
| 7,496,495 B2 | 2/2009 | Solomon et al. | |
| 7,502,823 B2 | 3/2009 | Garg et al. | |
| 7,526,561 B2 | 4/2009 | Bloch et al. | |
| 7,574,208 B2 | 8/2009 | Hanson et al. | |
| 7,574,709 B2 | 8/2009 | Erlingsson et al. | |
| 7,596,783 B2 * | 9/2009 | Huang et al. | 717/146 |
| 7,613,862 B2 | 11/2009 | Mihai | |
| 7,627,728 B1 | 12/2009 | Roeck et al. | |
| 7,644,264 B1 | 1/2010 | Olsen | |
| 7,676,538 B2 | 3/2010 | Potter et al. | |
| 7,685,593 B2 | 3/2010 | Solomon et al. | |
| 7,703,081 B1 | 4/2010 | Buches | |
| 7,703,083 B2 | 4/2010 | Shi et al. | |
| 7,769,720 B2 | 8/2010 | Armington | |
| 7,774,762 B2 | 8/2010 | Rochette et al. | |
| 7,788,669 B2 | 8/2010 | England et al. | |
| 7,812,985 B2 | 10/2010 | Nguyen et al. | |
| 7,844,442 B2 | 11/2010 | Tzruya | |
| 7,870,153 B2 | 1/2011 | Croft et al. | |
| 7,882,247 B2 | 2/2011 | Sturniolo et al. | |
| 7,886,183 B2 | 2/2011 | Krishnan et al. | |
| 7,913,252 B2 | 3/2011 | Shlomai | |
| 7,937,612 B1 | 5/2011 | Lyadvinsky et al. | |
| 7,971,049 B2 | 6/2011 | TeNgaio et al. | |
| 7,996,493 B2 | 8/2011 | Hill | |
| 8,019,861 B2 | 9/2011 | Ginzton | |
| 8,060,656 B2 | 11/2011 | Hanson et al. | |
| 8,074,231 B2 | 12/2011 | Hunt et al. | |
| 8,117,554 B1 | 2/2012 | Grechishkin et al. | |
| 8,150,971 B2 | 4/2012 | Lublin et al. | |
| 8,195,774 B2 | 6/2012 | Lambeth et al. | |
| 8,285,987 B1 | 10/2012 | Kimball et al. | |
| 8,418,236 B1 | 4/2013 | Havemose | |
| 8,424,082 B2 | 4/2013 | Chen et al. | |
| 8,505,029 B1 | 8/2013 | Chanda et al. | |
| 8,645,977 B2 | 2/2014 | Jacobson et al. | |
| 8,903,705 B2 | 12/2014 | Douceur et al. | |
| 2002/0019972 A1 | 2/2002 | Grier et al. | |
| 2002/0069192 A1 | 6/2002 | Aegerter | |
| 2003/0208595 A1 * | 11/2003 | Gouge et al. | 709/225 |
| 2003/0233404 A1 | 12/2003 | Hopkins | |
| 2004/0015537 A1 | 1/2004 | Doerksen et al. | |
| 2004/0168030 A1 | 8/2004 | Traversat et al. | |
| 2004/0172629 A1 | 9/2004 | Tene et al. | |
| 2004/0177243 A1 * | 9/2004 | Worley, Jr. | 713/2 |
| 2005/0033980 A1 | 2/2005 | Willman et al. | |
| 2005/0044534 A1 | 2/2005 | Darweesh et al. | |
| 2005/0060722 A1 | 3/2005 | Rochette et al. | |
| 2005/0076186 A1 | 4/2005 | Traut | |
| 2005/0080936 A1 | 4/2005 | Ray et al. | |
| 2005/0091226 A1 | 4/2005 | Lin et al. | |
| 2005/0102370 A1 | 5/2005 | Lin et al. | |
| 2005/0108171 A1 | 5/2005 | Bajikar et al. | |
| 2005/0177635 A1 | 8/2005 | Schmidt et al. | |
| 2005/0187894 A1 | 8/2005 | Pletcher et al. | |
| 2005/0198379 A1 | 9/2005 | Panasyuk et al. | |
| 2005/0203962 A1 | 9/2005 | Zhou et al. | |
| 2005/0240985 A1 | 10/2005 | Alkove et al. | |
| 2006/0004927 A1 | 1/2006 | Rehman et al. | |
| 2006/0005047 A1 * | 1/2006 | Lekatsas et al. | 713/193 |
| 2006/0037072 A1 | 2/2006 | Rao et al. | |
| 2006/0156418 A1 | 7/2006 | Polozoff | |
| 2006/0161563 A1 | 7/2006 | Besbris et al. | |
| 2006/0161982 A1 | 7/2006 | Chari et al. | |
| 2006/0184931 A1 | 8/2006 | Rochette et al. | |
| 2006/0248208 A1 * | 11/2006 | Walbeck et al. | 709/230 |
| 2006/0259734 A1 | 11/2006 | Sheu et al. | |
| 2006/0294518 A1 | 12/2006 | Richmond et al. | |
| 2007/0061556 A1 | 3/2007 | Rothman et al. | |
| 2007/0074191 A1 | 3/2007 | Geisinger | |
| 2007/0078950 A1 | 4/2007 | Hopkins et al. | |
| 2007/0134068 A1 | 6/2007 | Smith et al. | |
| 2007/0136579 A1 | 6/2007 | Levy et al. | |
| 2007/0136723 A1 | 6/2007 | Smith et al. | |
| 2007/0169116 A1 | 7/2007 | Gujarathi et al. | |
| 2007/0174910 A1 | 7/2007 | Zachman et al. | |
| 2007/0198657 A1 | 8/2007 | Saliba et al. | |
| 2007/0244980 A1 | 10/2007 | Baker, III et al. | |
| 2007/0250838 A1 | 10/2007 | Belady et al. | |
| 2007/0283324 A1 | 12/2007 | Geisinger | |
| 2007/0288228 A1 | 12/2007 | Taillefer et al. | |
| 2008/0005472 A1 | 1/2008 | Khalidi et al. | |
| 2008/0005794 A1 | 1/2008 | Inoue et al. | |
| 2008/0016339 A1 | 1/2008 | Shukla | |
| 2008/0028401 A1 | 1/2008 | Geisinger | |
| 2008/0127182 A1 | 5/2008 | Newport et al. | |
| 2008/0127225 A1 | 5/2008 | Mullis, et al. | |
| 2008/0222160 A1 | 9/2008 | MacDonald et al. | |
| 2008/0222628 A1 | 9/2008 | Batra et al. | |
| 2008/0263531 A1 | 10/2008 | Perry et al. | |
| 2008/0276012 A1 | 11/2008 | Mesa et al. | |
| 2009/0024757 A1 | 1/2009 | Proctor | |
| 2009/0064196 A1 | 3/2009 | Richardson et al. | |
| 2009/0094337 A1 | 4/2009 | Dias | |
| 2009/0204960 A1 | 8/2009 | Ben-Yehuda et al. | |
| 2009/0204961 A1 | 8/2009 | DeHaan et al. | |
| 2009/0210871 A1 | 8/2009 | Dechovich | |
| 2009/0217047 A1 | 8/2009 | Akashika et al. | |
| 2009/0249051 A1 | 10/2009 | TeNgaio et al. | |
| 2009/0259993 A1 | 10/2009 | Konduri et al. | |
| 2009/0265706 A1 | 10/2009 | Golosovker et al. | |
| 2009/0282266 A1 | 11/2009 | Fries et al. | |
| 2009/0282404 A1 | 11/2009 | Khandekar et al. | |
| 2009/0282474 A1 | 11/2009 | Chen et al. | |
| 2009/0307781 A1 * | 12/2009 | Iga et al. | 726/27 |
| 2009/0328225 A1 | 12/2009 | Chambers et al. | |
| 2010/0017461 A1 | 1/2010 | Kokkevis et al. | |
| 2010/0017857 A1 | 1/2010 | Kramer | |
| 2010/0023700 A1 * | 1/2010 | Chen et al. | 711/135 |
| 2010/0031276 A1 | 2/2010 | Hsieh | |
| 2010/0042636 A1 | 2/2010 | Lu | |
| 2010/0042796 A1 | 2/2010 | Vasilevsky et al. | |
| 2010/0042987 A1 | 2/2010 | Yamada | |
| 2010/0082926 A1 | 4/2010 | Sahita et al. | |
| 2010/0083015 A1 | 4/2010 | Yokota et al. | |
| 2010/0115334 A1 | 5/2010 | Malleck et al. | |
| 2010/0153659 A1 * | 6/2010 | Lovell et al. | 711/151 |
| 2010/0169407 A1 | 7/2010 | Hsueh et al. | |
| 2010/0169497 A1 | 7/2010 | Klimentiev et al. | |
| 2010/0174833 A1 * | 7/2010 | Filer et al. | 710/8 |
| 2010/0180275 A1 | 7/2010 | Neogi et al. | |
| 2010/0185956 A1 | 7/2010 | Anantharaman et al. | |
| 2010/0211663 A1 | 8/2010 | Barboy et al. | |
| 2010/0211956 A1 | 8/2010 | Gopisetty et al. | |
| 2010/0217853 A1 | 8/2010 | Alexander et al. | |
| 2010/0262853 A1 | 10/2010 | Goda | |
| 2010/0262977 A1 | 10/2010 | Havemose | |
| 2010/0287263 A1 | 11/2010 | Liu et al. | |
| 2010/0287548 A1 | 11/2010 | Zhou et al. | |
| 2010/0287618 A1 | 11/2010 | Howell et al. | |
| 2010/0293392 A1 | 11/2010 | Miyamoto | |
| 2010/0306848 A1 | 12/2010 | Gellerich | |
| 2010/0332629 A1 | 12/2010 | Cotugno et al. | |
| 2011/0004878 A1 | 1/2011 | Divoux | |
| 2011/0047376 A1 * | 2/2011 | Mittal | 713/164 |
| 2011/0119494 A1 * | 5/2011 | Huang et al. | 713/182 |
| 2011/0162082 A1 * | 6/2011 | Paksoy et al. | 726/26 |
| 2011/0191494 A1 | 8/2011 | Turanyi et al. | |
| 2011/0191788 A1 | 8/2011 | Jacobson et al. | |
| 2011/0202739 A1 | 8/2011 | Grisenthwaite | |
| 2011/0231670 A1 | 9/2011 | Shevchenko et al. | |
| 2011/0246551 A1 * | 10/2011 | Giancaspro et al. | 709/202 |
| 2011/0264788 A1 | 10/2011 | Costa | |
| 2011/0276806 A1 | 11/2011 | Casper et al. | |

(56) References Cited

U.S. PATENT DOCUMENTS

| | | |
|---|---|---|
| 2011/0277013 A1 | 11/2011 | Chinta |
| 2011/0296487 A1 | 12/2011 | Walsh |
| 2011/0302330 A1 | 12/2011 | Cota-Robles et al. |
| 2011/0302415 A1 | 12/2011 | Ahmad et al. |
| 2011/0320520 A1 | 12/2011 | Jain |
| 2012/0017213 A1 | 1/2012 | Hunt et al. |
| 2012/0036509 A1* | 2/2012 | Srinivasan et al. ............ 718/102 |
| 2012/0084562 A1 | 4/2012 | Farina et al. |
| 2012/0144042 A1 | 6/2012 | Lublin et al. |
| 2012/0159184 A1 | 6/2012 | Johnson et al. |
| 2012/0179485 A1 | 7/2012 | Saneii |
| 2012/0203932 A1 | 8/2012 | Da Costa et al. |
| 2012/0222025 A1 | 8/2012 | Pandit |
| 2012/0227038 A1 | 9/2012 | Hunt et al. |
| 2012/0227058 A1 | 9/2012 | Hunt et al. |
| 2012/0227061 A1 | 9/2012 | Hunt et al. |
| 2012/0265742 A1 | 10/2012 | Burckhardt et al. |
| 2012/0266167 A1 | 10/2012 | Spiers et al. |
| 2012/0291094 A9 | 11/2012 | Forrester et al. |
| 2012/0296626 A1 | 11/2012 | Bond et al. |
| 2012/0297249 A1 | 11/2012 | Yang et al. |
| 2013/0031371 A1 | 1/2013 | McLellan et al. |
| 2013/0036431 A1 | 2/2013 | Douceur et al. |
| 2013/0054734 A1 | 2/2013 | Bond et al. |
| 2013/0060947 A1 | 3/2013 | Nelson |
| 2013/0151846 A1 | 6/2013 | Baumann et al. |
| 2013/0151848 A1 | 6/2013 | Baumann et al. |
| 2013/0232345 A1 | 9/2013 | Johnson et al. |
| 2013/0254884 A1 | 9/2013 | Dalcher et al. |
| 2013/0333005 A1 | 12/2013 | Kim et al. |

FOREIGN PATENT DOCUMENTS

| | | |
|---|---|---|
| CN | 101174293 | 5/2008 |
| CN | 101448255 | 6/2009 |
| CN | 101632083 | 1/2010 |
| CN | 102077209 | 5/2011 |
| EP | 1526425 | 4/2005 |
| WO | WO2008111049 A2 | 9/2008 |
| WO | WO2011027191 A | 3/2011 |

OTHER PUBLICATIONS

Bagchi, Susmit, on Reliable Distributed IPC/RPC Design for Interactive Mobile Applications, 2010 ACM 978-1-4503-0047-Jun. 10, 2010, pp. 33-38.*

"Amazon Elastic Compute Cloud (EC2)", maluke.com, accessible from http://www.maluke.com/blog/amazon-elastic-compute-cloud-ec2, obtained on Dec. 5, 2011, 2 pages.

Ammons et al., "Libra: A Library OS for a JVM in a Virtualized Execution Environment", In Proceedings of the 3rd International Conference on Virtual Execution Environments, Jun. 13-15, 2007, 11 pages.

Anderson, "The Case for Application-specific Operating Systems", In Proceedings of the 3rd Workshop on Workstation Operating Systems, Apr. 23-24, 1992, 3 pages.

Zhang, et al., "A CORBA Trader-based Dynamic Binding Infrastructure in Pervasive Computing", retrieved on Oct. 11, 2010 at <<http://ieeexplore.ieee.org/stamp/stamp.jsp?tp=&arnumber=4079032>>, International Symposium on Pervasive Computing and Applications, 2006, pp. 12-16.

Appavoo et al., "Providing a Linux API on the Scalable K42 Kernel", In Proceedings of the 2003 USENIX Annual Technical Conference, Jun. 9-14, 2003, 14 pages.

"Aquifer Application Services Platform Version 5.5", retrieved on Mar. 3, 2009 at <<http://www.sysmanagement.com/enterpriseProducts/overview.aspx>>, Systems Management Engineering 2003, 2 pages.

Azab et al., "SICE: A Hardware-Level Strongly Isolated Computing Environment for x86 Multi-core Platforms", CCS11, Oct. 17-21, 2011, Chicago, Illinois, 14 pages.

Barham et al., "Xen and the Art of Virtualization", In Proceedings of the 19th ACM Symposium on Operating Systems Principles, Oct. 19-22, 2003, 14 pages.

Baumann et al., "The Multikernel: A New OS Architecture for Scalable Multicore Systems", In Proceedings of the 22nd ACM Symposium on Operating Systems Principles, Oct. 11-14, 2009, 15 pages.

Bershad et al., "Extensibility, Safety and Performance in the SPIN Operating System", Proceedings of the fifteenth ACM symposium on Operating systems principles, Published Date: Dec. 3, 1995, 17 pages.

Bhattiprolu et al., "Virtual Servers and Checkpoint/Restart in Mainstream Linux", SIGOPS Operating Systems Review, Jul. 2008, 10 pages.

"Browser Swallows OS", retrieved on Mar. 3, 2009 at <<http://www.desktoplinux.com/news/NS2750645189.html>>, Ziff Davis Enterprise Holdings Inc., Dec. 1, 2008, 3 pages.

Bugnion et al., "Disco: Running Commodity Operating Systems on Scalable Multiprocessors", ACM Transactions on Computer Systems, vol. 15, No. 4, Nov. 1997, 36 pages.

Celesti et al., "Improving Virtual Machine Migration in Federated Cloud Environments", Second International Conference on Evolving Internet, Published date: Sep. 20-25, 2010, 7 pages.

Chahal et al., "Testing Live Migration with Intel Virtualization Technology FlexMigration", Intel Information Technology, Jan. 2009, 12 pages.

Chang et al., "User-level Resource-constrained Sandboxing", USENIX-NT, Aug. 2000, 11 pages.

Chen et al., "Setuid Demystified", In Proceedings of the 11 th USENIX Security Symposium, Aug. 5-9, 2002, 20 pages.

Chen, "Native Client: A Technology for Running Native Code on the Web", retrieved on Mar. 3, 2009 at <<http://google-code-updates.blogspot.com/2008/12/native-client-technology-for-running.html>>, Google Code Blog, Dec. 8, 2008, 21 pages.

Cheriton et al., "A Caching Model of Operating System Kernel Functionality", In Proceedings of the 1st USENIX Symposium on Operating Systems Design and Implementation, Nov. 1994, 15 pages.

Chernoff, et al., "DIGITAL FX!32 Running 32-Bit x86 Applications on Alpha NT", retrieved on Mar. 3, 2009 at <<http://citeseerx.ist.psu.edu/viewdoc/summary?doi=10.1.1.21.8607>>, Proceedings of the USENIX Windows NT Workshop, Seattle, WA., Aug. 1997, 8 pages.

Chiueh, et al., "Integrating Segmentation and Paging Protection for Safe, Efficient and Transparents Software Extensions", retrieved on Mar. 3, 2009 at <<http://www.sigops.org/sosp99/slides/kernel/chiueh.ps>>, Computer Science Dept., State University of New York, NY., 22 pages.

Christodorescu et al., "Cloud Security Is Not (Just) Virtualization Security", CCSW09, Nov. 13, 2009, Chicago, Illinois, 6 pages.

Clark, et al., "Live Migration of Virtual Machines", retrieved on Mar. 3, 2009 at <<http://www.cl.cam.ac.uk/research/srg/netos/papers/2005-migration-nsdi-pre.pdf>>, 14 pages.

"CLOC Count Lines of Code", retrieved on Mar. 3, 2009 at <<http://cloc.sourceforge.net/>>, Northrop Grummam Corporation / Information Technology / IT Solutions, 2006-2009, 15 pages.

Yee et al., "Native Client: A Sandbox for Portable, Untrusted x86 Native Code", In Proceedings of the 30th IEEE Symposium on Security and Privacy, May 17-20, 2009, 15 pages.

Cox, et al., "A Safety-Oriented Platform for Web Applications", retrieved on Mar. 3, 2009 at <<http://www.cs.washington.edu/homes/gribble/papers/gribble-Tahoma.pdf>>, 15 pages.

"CVE-2003-0111", retrieved on Mar. 3, 2009 at <<http://cve.mitre.org/cgi-bin/cvename.cgi?name=CAN-2003-0111>>, Common Vulnerabilities and Exposures website, 2009, 1 page.

"CVE-2007-0043", retrieved on Mar. 3, 2009 at <<http://cve.mitre.org/cgi-bin/cvename.cgi?name=CVE-2007-0043>>, Common Vulnerabilities and Exposures website, 2009, 1 page.

"Debian Counting", retrieved on Mar. 3, 2009 at <<http://libresoft.dat.escet.urjc.es/debian-counting/>>, Grupo de Sistemas y Comunicaciones, Universidad Rey Juan Carlos, Mostoles, Madrid, Spain, 2004-2005, 1 page.

Microsoft—TechNet, Device Management and Installation Step-by-Step Guide, retrieved on Apr. 14, 2011 at <<http://technet.microsoft.com/en-us/library/dd919230%28WS.10%29.aspx>>, 2 pages.

(56) References Cited

OTHER PUBLICATIONS

Douceur et al., "Leveraging Legacy Code to Deploy Desktop Applications on the Web", In Proceedings of the 8th USENIX Symposium on Operating Systems Design and Implementation, Dec. 2008, 16 pages.
Douceur, et al., "Leveraging Legacy Code to Deploy Desktop Applications on the Web", retrieved on Mar. 3, 2009 at <<http://www.usenix.org/events/osdi08/tech/full_papers/douceur/douceur_html/index.html>>, Microsoft Research, pp. 1-21.
Douceur, et al., "Leveraging Legacy Code to Deploy Desktop Applications on the Web", retrieved on Oct. 11, 2010 at <<http://research.microsoft.com/pubs/72878/xax-osdi08.pdf>>, USENIX Association, Proceedings of Conference on Operating Systems Design and Implementation, San Diego, California, 2008, pp. 339-354.
Eiraku et al., "Fast Networking with Socket Outsourcing in Hosted Virtual Machine Environments", In Proceedings of the 24th ACM Symposium on Applied Computing, Mar. 8-12, 2009, 8 pages.
Engler et al., "Exokernel: An Operating System Architecture for Application-level Resource Management", In Proceedings of the 15th ACM Symposium on Operating Systems Principles, Dec. 3-6, 1995, 16 pages.
Erlingsson, et al., "XFI: Software Guards for System Address Spaces", retrieved on Mar. 3, 2009 at <<http://www.cs.ucsd.edu/~mvrable/papers/2006-osdi-xfi.pdf>>, Microsoft Research, Silicon Valley, pp. 1-14.
Ford, et al., "Vx32: Lightweight, User-level Sandboxing on the x86", retrieved on Mar. 3, 2009 at <<http://pdos.csail.mit.edu/papers/vx32:usenix08/>>, Massachusetts Institute of Technology, 20 pages.
Ford, et al., "VXA: A Virtual Architecture for Durable Compressed Archives", retrieved on Mar. 3, 2009 at <<http://pdos.csail.mit.edu/papers/vxa:fast05.pdf>>, Computer Science and Artificial Intelligence Laboratory, MIT, Mass., 14 pages.
Franke et al., "Fuss, Futexes and Furwocks: Fast Userlevel Locking in Linux", In Proceedings of the Ottawa Linux Symposium, Jul. 11-14, 2010, 19 pages.
Garfinkel et al., "Flexible OS Support and Applications for Trusted Computing", Proceedings of the 9th conference on Hot Topics in Operating Systems, May 2003, 6 pages.
Garfinkel et al., "Terra: A Virtual Machine-Based Platform for Trusted Computing", Proceedings of the nineteenth ACM symposium on Operating systems principles, Published Date: Oct. 22, 2003, 14 pages.
Garfinkel, "Traps and Pitfalls: Practical Problems in System Call Interposition Based Security Tools", In Proceedings of the Network and Distributed Systems Security Symposium, Feb. 6-7, 2003, 14 pages.
Garfinkel, et al., "Ostia: A Delegating Architecture for Secure System Call Interposition", retrieved on Mar. 3, 2009 at <<http://www.isoc.org/isoc/conferences/ndss/04/proceedings/Papers/Gardinkel.pdf>>, Computer Science Department, Stanford University, CA., 15 pages.
Garfinkel, "Traps and Pitfalls: Practical Problems in System Call Interposition Based Security Tools", retrieved on Mar. 3, 2009 at <<http://www.stanford.edu/~talg/papers/traps/traps-ndss03.pdf>>, Computer Science Department, Stanford University, 14 pages.
Goldberg, et al., "A Secure Environment for Untrusted Helper Applications (Confining the Wily Hacker)", retrieved on Mar. 3, 2009 at <<http://www.usenix.org/publications/library/proceedings/sec96/full_papers/goldberg/goldberg.pdf>>, Proceedings of the Sixth USENIX UNIX Security Symposium, San Jose, CA., Jul. 1996, 14 pages.
"Gears Improving Your Web Browser", retrieved on Mar. 3, 2009 at << http://gears.google.com/>>, Google 2008, 1 page.
Gupta et al., "Difference Engine: Harnessing Memory Redundancy in Virtual Machines", In Proceedings of the 8th USENIX Symposium on Operating Systems Design and Implementation, Dec. 8-10, 2008, 14 pages.
Haff, "RingCube brings 'containers' to the client", retrieved on Oct. 11, 2010 at <<http://news.cnet.com/8301-13556_3-10158247-61.html>>, CNET News, Feb. 6, 2009, pp. 1-3.

Harren, et al., "Using Dependent Types to Certify the Safety of Assembly Code", retrieved on Mar. 3, 2009 at <<http://www.cs.berkeley.edu/~necula/Papers/deptypes_sas05.pdf>>, Static Analysis Symposium (SAS) 2005, pp. 155-170.
Helander, "Unix Under Mach: The Lites Server", Helsinki University of Technology, Helsinki, Dec. 30, 1994, 71 pages.
Howell et al., "Living Dangerously: A Survey of Software Download Practices", Microsoft Research, May 2010, 16 pages.
"iKernel: Isolating Buggy and Malicious Device Drivers Using . . .", SlideShare, Inc., retrieved on Aug. 4, 2011 at <<http://www.slideshare.net/Cameroon45/ikernel-isolating-buggy-and-malicious-device-drivers-using>>, 7 pages.
Intel Cloud Builder Guide, "Intel Cloud Builders Guide to Cloud Design and Deployment on Intel Platforms", www.intel.com/en_US/Assets/PDF/general/icb_ra_cloud_computing_Parallels_TCP.pdf, Retrieved Date: Dec. 7, 2011, 19 pages.
Jackson, et al., "Protecting Browser State from Web Privacy Attacks", retrieved on Mar. 3, 2009 at <<http://portal.acm.org/citation.cfm?id=1135884>>, WWW 2006, May 23-26, 2006, Edinburgh, Scotland, pp. 737-744.
Jobs, "Keynote Address", Apple Worldwide Developers Conference, Aug. 2006, 3 pages.
Kiciman, et al., "AjaxScope: A Platform for Remotely Monitoring the Client-Side Behavior of Web 2.0 Applications", retrieved on Mar. 3, 2009 at <<http://research.microsoft.com/en-us/projects/ajaxview/ajaxscope-sosp.pdf>>, SOSP 2007, Oct. 14-17, 2007, Stevenson, WA., 14 pages.
Ko et al., "TrustCloud: A Framework for Accountability and Trust in Cloud Computing", Published Jul. 8, 2011, 5 pages.
Kozuch, et al., "Internet Suspend/Resume", retrieved on Mar. 3, 2009 at <<http://www.intel-research.net/Publications/Pittsburgh/110620030912_88.pdf>>, Fourth IEEE Workshop on Mobile Computing Systems and Applications, Callicoon, NY, Jun. 2002, 8 pages.
Leslie et al, "The Design and Implementation of an Operating System to Support Distributed Multimedia Applications", IEEE Journal on Selected Areas in Communications, May 1996, 18 pages.
Litzkow et al., "Checkpoint and Migration of UNIX Processes in the Condor Distributed Processing System", University of Wisconsin Madison, Apr. 1997, 9 pages.
"Live from CES: Hands on With Vista—Vista by the Numbers, A Developer Tells All", retrieved on Mar. 3, 2009 at <<http://ces.gearlive.com/cesblog/article/live-from-ces-hands-on-with-vistamdashvista-by-the-numbers-0108051321/>>, 5 pages.
Livshits, et al., "Doloto: Code Splitting for Network-Bound Web 2.0 Applications", retrieved on Mar. 3, 2009 at <<ftp://ftp.research.microsoft.com/pub/tr/TR-2007-159.pdf>>, Microsoft Research, pp. 1-25.
Lorch, et al., "The VTrace Tool: Building a System Tracer for Windows NT and Windows 2000", retrieved on Mar. 3, 2009 at <<http://msdn.microsoft.com/en-us/magazine/cc302289(printer).aspx>>, Microsoft Corporation 2009, 10 pages.
Loscocco et al., "Integrating Flexible Support for Security Policies into the Linux Operating System", In Proceedings of the 2001 USENIX Annual Technical Conference, Feb. 2001, 62 pages.
Love, "Get on the D-BUS", Linux Journal, accesible from http://www.ee.ryerson.ca/~courses/coe518/LinuxJournal/elj2005-130-D-BUS.pdf, obtained on Jun. 18, 2006, 5 pages.
OSdata.com, "Maintenance and Administration," retrieved on Apr. 14, 2011 at <<http://www.osdata.com/holistic/maintain/maintain.htm>>, 8 pages.
Malan et al., "DOS as a Mach 3.0 Application", In Proceedings of the USENIX Mach Symposium, Nov. 1991, 14 pages.
Marosi et al., "Using VirtualMachines in Desktop Grid Clients for Application Sandboxing", CoreGRID Technical Report, No. TR-140, Aug. 31, 2008, 13 pages.
McCamant, et al., "Evaluating SFI for a CISC Architecture", retrieved on Mar. 3, 2009 at <<http://groups.csail.mit.edu/pag/pubs/pittsfield-usenix2006.pdf>>, pp. 1-16.
McIlroy, "Mass Produced Software Components", retrieved on Mar. 3, 2009 at <<http://www.dcs.gla.ac.uk/courses/teaching/mscweb/rrcs/papers/SE/McIlroy.pdf >>, 12 pages.

(56) References Cited

OTHER PUBLICATIONS

Microsoft, "Microsoft Application Virtualization (App-V)", accessible from http://www.microsoft.com/en-us/windows/enterprise/products-and-technologies/virtualization/app-v.aspx, obtained on Dec. 7, 2011, 2 pages.
Microsoft, "Performance Tuning Guidelines for Windows Server 2008 R2", Redmond, WA, May 16, 2011, 118 pages.
Microsoft, "Remote Desktop Protocol: Basic Connectivity and Graphics Remoting Specification", Redmond, WA, release: Sep. 20, 2011, 417 pages.
Mihocka et al., "Virtualization without direct execution or jitting: designing a portable virtual machine infrastructure", retrieved at bochs.sourceforge.net/Virtualization_Without_Hardware_Final.PDF, Jun. 21, 2008, 16 pages.
Morrisett, et al., "From System F to Typed Assembly Language", retrieved on Mar. 3, 2009 at <<http://www.cs.princeton.edu/~dpw/papers/tal-toplas.pdf>>, Mar. 1999, pp. 1-41.
"Mozilla: The browser as operating system", retrieved on Mar. 3, 2009 at <<http://www.mathewingram.com/work/2008/08/26/mozilla-the-browser-as-operating-system/>>, Aug. 26, 2008, 8 pages.
Necula, et al., "CCured: Type-Safe Retrofitting of Legacy Software", retrieved on Mar. 3, 2009 at <<http://www.eecs.berkeley.edu/~necula/Papers/ccured_toplas.pdf>>, ACM Transactions on Programming Languages and Systems, vol. 27, No. 3, May 2005, 48 pages.
Necula, et al., "Safe Kernel Extensions Without Run-Time Checking", retrieved on Mar. 3, 2009 at <<http://citeseerx.ist.psu.edu/viewdoc/summary?doi=10.1.1.40.3010>>, Proceedings of the Second Symposium on Operating Systems Design and Implementation (OSDI 1996), Seattle, WA., Oct. 28-31, 1996, 15 pages.
"CWE-Common Weakness Enumeration", retrieved on Mar. 3, 2009 at <<http://nvd.nist.gov/cwe.cfm>>, National Vulnerability Database, NIST, 3 pages.
Office action for U.S. Appl. No. 12/463,892, mailed on Jun. 14, 2012, Howell et al., "Executing Native-Code Applications in a Browser", 15 pages.
Office Action for U.S. Appl. No. 12/463,892, mailed on Dec. 6, 2011, Jonathan R. Howell, "Executing Native-Code Applications in a Browser", 21 pgs.
"Outsource Web Enabling your Legacy Applications to O2I", retrieved on Mar. 3, 2009 at <<http://www.outsource2india.com/software/LegacySystems.asp>>, Flatworld Solutions Company, 2008, 7 pages.
Piotrowski, et al., "Virtics: A System for Privilege Separation of Legacy Desktop Applications", retrieved on Oct. 11, 2010 at <<http://www.eecs.berkeley.edu/Pubs/TechRpts/2010/EECS-2010-70.pdf>>, EECS Department, University of California at Berkeley, Technical Report No. UCB/EECS-2010-70, May 13, 2010, pp. 1-21.
Porter et al., "Rethinking the Library OS from the Top Down", ASPLOS' 11, Mar. 5-11, 2011, Newport Beach, California, 15 pages.
Price et al., "Solaris Zones: Operating System Support for Server Consolidation", In Proceedings of the Large Installation Systems Administration Conference, Nov. 2004, 2 pages.
Provos, "Improving Host Security with System Call Policies", retrieved on Mar. 3, 2009 at <<http://www.citi.umich.edu/u/provos/papers/systrace.pdf>>, Center for Information Technology Integration, University of Michigan, 15 pages.
Puder, "Extending Desktop Applications to the Web", retrieved on Mar. 3, 2009 at <<http://www.puder.org/publications/dorea04.pdf>>, San Francisco State University, Computer Science Department, 6 pages.
Purdy, et al., "Google Chrome as Future Operating System", retrieved on Mar. 3, 2009 at <<http://lifehacker.com/5053069/google-chrome-as-future-operating-system>>, Sep. 22, 2008, 1 page.
Resig, "The Browser Operating System", retrieved on Mar. 3, 2009 at <<http://ejohn.org/blog/the-browser-operating-system/>>, Feb. 22, 2009, 5 pages.

Rinard, et al., "Enhancing Server Availability and Security Through Failure-Oblivious Computing", retrieved on Mar. 3, 2009 at <<http://web.mit.edu/droy/www/papers/osdi04.pdf>>, Computer Science and Artificial Intelligence Laboratory, MIT, Mass., 14 pages.
Roscoe et al., "Hype and Virtue", In Proceedings of the 11th USENIX Workshop on Hot Topics in Operating Systems, Aug. 2007, 6 pages.
Sabin, "Strace for NT", retrieved on Mar. 3, 2009 at <<http://www.securityfocus.com/tools/1276>>, SecurityFocus 2007, 1 page
Sapuntzakis et al., "Virtual Appliances for Deploying and Maintaining Software", In Proceedings of the Large Installation Systems Administration Conference, Oct. 2003, 15 pages.
Sapuntzakis, et al., "Optimizing the Migration of Virtual Computers", retrieved on Mar. 3, 2009 at <<http://suif.stanford.edu/collective/osdi02-optimize-migrate-computer.pdf>>, Computer Science Department, Stanford University, 14 pages.
"Secunia Advisories: SA7587", retrieved on Mar. 3, 2009 at <<http://secunia.com/advisories/7587/>>, Secunia 2002-2009, 4 pages.
Smith, Roderick W., "Using QEMU for cross-platform development", retrieved at www.ibm.com/developerworks/linux/library/I-qemu-development/?ca=drs-, Feb. 9, 2010, 7 pages.
Soltesz et al., "Container-based Operating System Virtualization: A Scalable, High-performance Alternative to Hypervisors", In Proceedings of the 2nd ACM SIGOPS/EuroSys European Conference on Computer Systems, Mar. 21-23, 2007, 13 pages.
"Open Source Software", retrieved on Mar. 3, 2009 at <<http://sourceforge.net>>, SourceForge, Inc., 1999-2009, 1 page.
Spear et al., "Solving the Starting Problem: Device Drivers as Self-describing Artifacts", In Proceedings of the EuroSys 2006 Conference, Apr. 18-21, 2006, 13 pages.
Stokely, "The FreeBSD Handbook", 3rd Edition, vol. 1: User's Guide, FreeBSD Mall, Inc., Brentwood, CA., 2003, 408 pgs.
Sugerman et al., "Virtualizing I/O Devices on VMware Workstations Hosted Virtual Machine Monitor", In Proceedings of the 2001 USENIX Annual Technical Conference, Jun. 25-30, 2001, 15 pages.
"Sun Ray Ultra-Thin Clients in Technical Computing", retrieved on Oct. 11, 2010 at <<http://www.sun-rays.org/lib/hardware/sunray/ds/sunray_tc.pdf>>, Sun Microsystems, Inc., Datasheet, 2003, pp. 1-2.
Swift, et al., "Improving the Reliability of Commodity Operating Systems", retrieved on Mar. 3, 2009 at <<http://nooks.cs.washington.edu/nooks-tocs.pdf>>, University of Washington, pp. 1-33.
Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, 5 pages.
Szefer et al., "Eliminating the Hypervisor Attack Surface for a More Secure Cloud", published Oct. 17-21, 2011, CCS11, 12 pages.
Ta-Min et al., "Splitting Interfaces: Making Trust between Applications and Operating Systems Configurable", Proceedings of the 7th symposium on Operating systems design and implementation, Published Date: Nov. 2006, 14 pages.
"The Dojo Offline Toolkit", retrieved on Mar. 3, 2009 at <<http://dojotoolkit.org/offline>>, The Dojo Foundation, 3 pages.
Tridgell, "Efficient Algorithms for Sorting and Synchronization", retrieved on Mar. 3, 2009 at <<http://www.samba.org/~tridge/phd_thesis.pdf>>, Australian National University, Feb. 1999, 115 pages.
Tucker et al., "Solaris Zones: Operating System Support for Server Consolidation", retrieved on Mar. 3, 2009 at <<http://www.usenix.org/events/vm04/wips/tucker.pdf>>, Sun Microsystems, Inc., 2 pages.
"User-Mode Driver Framework (UMDF)", Microsoft Windows, retrieved on AUg. 4, 2011 at <<http://msdn.microsoft.com/en-us/windows/hardware/gg463294.aspx>>, 1 page.
VMWare ThinApp, "Application Virtualization Made Simple", accessible from http://www.vmware.com/products/thinapp/overview.html, data sheet obtained on Aug. 29, 2012, 2 pages.
Wahbe, et al., "Efficient Software-Based Fault Isolation", retrieved on Mar. 3, 2009 at <<http://crypto.stanford.edu/cs155/papers/sfi.pdf>>, SIGOPS 1993/12/93/N.C., USA, pp. 203-216.
Zeldovich et al., "Making Information Flow Explicit in Histar", In Proceedings of the 8th USENIX Symposium on Operating Systems Design and Implementation, Nov. 2006, 16 pages.

(56) References Cited

OTHER PUBLICATIONS

Waldspurger, "Memory Resource Management in VMware ESX Server", retrieved on Mar. 3, 2009 at <<http://www.waldspurger.org/carl/papers/esx-mem-osdi02.pdf>>, Proc. Fifth Symposium on Operating Systems Design and Implementation (OSDI 2002), Dec. 2002, pp. 1-14.
"What is JPC?", retrieved on Mar. 3, 2009 at <<http://www-jpc.physics.ox.ac.uk/>>, Oxford University, 2004-2007, 2 pages.
Whitaker et al., "Scale and Performance in the Denali Isolation Kernel", In Proceedings of the 5th USENIX Symposium on Operating Systems Design and Implementation, Dec. 9-11, 2002, 15 pages.
Whitaker, et al., "Danali: Lightweight Virtual Machines for Distributed and Networked Applications", retrieved on Mar. 3, 2009 at <<http://denali.cs.washington.edu/pubs/distpubs/papers/denali_usenix2002.pdf>>, University of Washington, 14 pages.
"Windows Driver Kit", retrieved on Mar. 3, 2009 at <<http://microsoft.com/whdc/devtools/wdk/default.mspx>>, Microsoft Corporation 2009, 2 pages.
"Windows User Mode Driver Framework", From Wikipedia, the free encyclopedia, Retrieved on Aug. 4, 2011 at <<http://en.wikipedia.org/wiki/User-Mode_Driver_Framework>>, 2 pages.
"WineHQ", retrieved on Mar. 3, 2009 at <<http://www.winehq.org/>>, 3 pages.
Witchel, et al., "Mondrix: Memory Isolation for Linux using Mondriaan Memory Protection", retrieved on Mar. 3, 2009 at <<http://www.cag.lcs.mit.edu/scale/papers/mmp-sosp2005.pdf>>, SOSP 2005, Oct. 23-26, 2005, Brighton, UK, 14 pages.
Wood, et al., "CloudNet: Dynamic Pooling of Cloud Resources by Live WAN Migration of Virtual Machines", VEE'11, Mar. 9-11, 2011, Newport Beach, California, 12 pages.
LeVasseur et al., "Pre-Virtualization: Slashing the Cost of Virtualization", University of Karlsruhe, Germany, IBM, T. J. Watson Research Center, New York National ICT, Australia University of New South Wales, Australia, Nov. 2005.
Microsoft-TechNet.com, "Device Management and Installation Step-by-Step Guide: Signing and Staging Device Drivers in Windows 7 and Windows Server 2008 R2" retrieved Apr. 14, 2011, 2 pages.
Office Action dated Jun. 10, 2013 for related matter U.S. Appl. No. 13/107,973 (332238.01), Bond et al., "Instruction Set Emulation for Guest Operating Systems".
Office Action dated Dec. 21, 2012 for related matter U.S. Appl. No. 13/107,973 (332238.01), Bond et al., "Instruction Set Emulation for Guest Operating Systems".
Office action for U.S. Appl. No. 13/372,390, mailed on Mar. 12, 2013, Baumann et al., "Cryptographic Certification of Secure Hosted Execution Environments", 16 pages.
Office action for U.S. Appl. No. 12/972,081, mailed on Apr. 5, 2013, Douceur et al., "Application Compatibility Shims for Minimal Client Computers", 13 pages.
Office action for U.S. Appl. No. 13/196,235, mailed on Apr. 8, 2013, Douceur et al., "Constraining Execution of Specified Device Drivers ", 24 pages.
OSdata.com, "Maintenance and Administration" retrieved on Apr. 14, 2011 at <<http://www.osdata.com/holistic/maintain/maintain.htm>>, 8 pages.
Vaarala, S., "Security Considerations of Commodity x86 Virtualization", Helsinki University of Technology, Telecommunications Software and Multimedia Laboratory, May 22, 2006, 150 pages.
Wang et al., "Protection and Communication Abstractions for Web Browsers in MashupOS", SOS, 2007, 15 pages.
Allen, "Windows Vista Application Development Requirements for User Account Control Compatibility", retrieved from <<http://msdn.microsoft.com/en-us/library/bb530410.aspx>>, Jun. 2007, 59 pages.
Charles, "Mark Russinovich: Inside Windows 7", retrieved at <<http://channel9.msdn.com/Shows/Going+Deep/Mark-Russinovich-Inside-Windows-7>>, Jan. 2009, 12 pages.
"Escaping from Microsoft's Protected Mode Internet Explorer—Evaluating a potential security boundary", retrieved at <<http://www.verizonbusiness.com/resources/whitepapers/wp_escapingmicrosoftprotectedmodeinternetexplorer_en_xg.pdf>>, White Paper, Nov. 2010, 8 pages.
Fischer, "Red Hat Enterprise Linux 4 Application Compatibility", retrieved from <<<http://www.redhat.com/f/pdf/rhel4/AppCompat.pdf>>, Feb. 2005, 12 pages.
International Search Report for International Appl. No. PCT/US2012/027635 dated Oct. 30, 2012, 3 pages.
"Internet Information Services 7.5", Retrieved at <<http://technet.microsoft.com/en-us/library//dd364124(wa.10).aspx>>, Mar. 24, 2009, 3 pages.
Kobayashi, et al., "Quick Reboot-based Recovery for Commodity Operating Systems in Virtualized Server Consolidation," Retrieved at <<http://eurosys2010-dev.sigops-france.fr/workshops/IIDS2010/iids2010_7.pdf>>, Feb. 2010, Association for Computing Machinery, 6 pages.
NPL Search Results U.S. Appl. No. 13/196,235, Elsevier Eng. Info. Inc., 2013, 23 pages.
Office action for U.S. Appl. No. 12/972,081, mailed on Sep. 10, 2013, Douceur, et al., "Application Compatibility Shims for Minimal Client Computers", 18 pages.
Office action for U.S. Appl. No. 13/323,465, mailed on Sep. 13, 2013, Baumann, et al., "Cryptographic Certification of Secure Hosted Execution Environments", 15 pages.
Office action for U.S. Appl. No. 13/372,390, mailed on Sep. 19, 2013, Baumann, et al., "Cryptographic Certification of Secure Hosted Execution Environments", 20 pages.
Office action for U.S. Appl. No. 13/196,235, mailed on Oct. 15, 2013, Douceur, et al., "Constraining Execution of Specified Device Drivers ", 29 pages.
Office action for U.S. Appl. No. 13/107,973, mailed Oct. 25, 2013, Bond, "Instruction Set Emulation for Guest Operating Systems", 12 pages.
Office Action for U.S. Appl. No. 12/834,895, mailed on Nov. 6, 2012, Hunt, et al., "Ultra-Low Cost Sandboxing for Application Appliances", 19 pages.
Office Action for U.S. Appl. No. 13/345,031, mailed on Nov. 6, 2013, Hunt, et al., "Dynamic Application Migration", 8 pages.
Office Action for U.S. Appl. No. 12/834,895, mailed on Apr. 30, 2013, Hunt, et al., "Ultra-Low Cost Sandboxing for Application Appliances", 23 pages.
Office Action for U.S. Appl. No. 13/314,512, mailed on Jul. 30, 2013, Hunt, et al., "Application Compatibility with Library Operating Systems", 19 pages.
Vaughan-Nichols, "New Approach to Virtualization Is a Lightweight," retrieved at <<http://ieeexplore.ieee.org/stamp/stamp.jsp?tp=&arnumber=4014757>>, IEEE, Computer, vol. 39, Issue 11, Nov. 2006, pp. 12-14.
The Supplementary European Search Report mailed Sep. 3, 2014 for European Patent Application No. 12858587.4, 3 pages.
Final Office Action for U.S. Appl. No. 13/314,512, mailed on Jul. 15, 2014, Hunt, et al., 29 pages.
Final Office Action for U.S. Appl. No. 13/215,244, mailed on Sep. 26, 2014, Bond, et al., 17 pages.
Office action for U.S. Appl. No. 13/323,465, mailed on Mar. 12, 2014, Baumann et al., "Cryptographic Certification of Secure Hosted Execution Environments", 20 pages.
Office action for U.S. Appl. No. 12/972,081, mailed on Apr. 17, 2014, Douceur et al., "Application Compatibility Shims for Minimal Client Computers", 27 pages.
Yee et al., "Native Client: A Sandbox for Portable, Untrusted x86 Native Code", 2009 30th IEEE Symposium on Security and Privacy, 2009, 15 pages.
Yu et al., "A Feather-weight Virtual Machine for Windows Applications", VEE'06, 2006, 11 pages.
Zhou et al., "Flexible On-Device Service Object Replication with Replets", In the Proceedings of the 13th International Conference on World Wide Web, May 17, 2004, pp. 131-142.
Office Action for U.S. Appl. No. 13/107,973, mailed May 21, 2014, for Bond, et al., "Instruction Set Emulation for Guest Operating Systems," 8 pages.

(56) References Cited

OTHER PUBLICATIONS

Office Action for U.S. Appl. No. 13/215,244, mailed on Feb. 28, 2014 for Bond, et al., "Migration of Coud Applications Between a Local Computing Device and Cloud," 14 pages.
Office action for U.S. Appl. No. 13/196,235, mailed on Apr. 9, 2014, Douceur et al., "Constraining Execution of Specified Device Drivers ", 34 pages.
Non-Final Office Action for U.S. Appl. No. 13/196,235, mailed on Jul. 3, 2014, Douceur et al., "Constraining Execution of Specified Device Drivers ", 31 pages.
International Search Report and Written Opinion for PCT Application PCT/US12/27635 dated Oct. 30, 2012, 7 pages.
Office Action for U.S. Appl. No. 13/314,512, mailed on Jun. 25, 2015, Hunt et al., "Application Compatibility with Library Operating Systems", 12 pages.
Office Action for U.S. Appl. No. 13/331,078, mailed on Jul. 16, 2015, Hunt et al., "Lightweight On-Demand Virtual Machines", 10 pages.
Office Action for U.S. Appl. No. 13/323,465, mailed on Jul. 22, 2015, Baumann et al., "Cryptographic Certification of Secure Hosted Execution Environments", 29 pages.
Office Action for U.S. Appl. No. 13/372,390, mailed on Jul. 22, 2015, Baumann et al., "Cryptographic Certification of Secure Hosted Execution Environments", 24 pages.
Chinese Office Action mailed Jan. 28, 2015 for Chinese patent application No. 201210537282.X, a counterpart foreign application of U.S. Appl. No. 13/323,562, 14 pages.
Chinese Office Action mailed Dec. 3, 2014 for Chinese patent application No. 201210533610.9, a counterpart foreign application of U.S. Appl. No. 13/323,465, 12 page.
European Office Action mailed Oct. 21. 2014 for European patent application No. 12858587.4, a counterpart foreign application of U.S. Appl. No. 13/323,465, 7 pages.
International Search Report and Written Opinion for PCT Application PCT/US2012/067662 dated Mar. 11, 2013, 6 pages.
International Search Report and Written Opinion for PCT Application PCT/US2012/067660 dated Mar. 20, 2013, 4 pages.
Microsoft Corp, "Internet Information Services 7.5", retrieved at <<http:technet.microsoft.com/en-us/library/dd364124(v=ws.10). aspx, Mar. 2009, 2 pages.
Microsoft Press, "Microsoft Computer Dictionary, 5th Edition", One Microsoft Way, Redmond, WA, Copyright 2002, 648 pages.
Office action for U.S. Appl. No. 13/196,235, mailed on Nov. 21, 2014, Douceur, et al., "Constraining Execution of Specified Device Drivers ", 30 pages.
Office action for U.S. Appl. No. 13/372,390, mailed on Dec. 19, 2014, Baumann, et al., "Cryptographic Certification of Secure Hosted Execution Environments", 23 pages.
Office action for U.S. Appl. No. 13/331,078, mailed on Dec. 22, 2014, Hunt, et al., "Lightweight On-Demand Virtual Machines", 7 pages.
Office action for U.S. Appl. No. 13/215,244, mailed on Feb. 23, 2015, Bond, et al., "Migration of Cloud Application Between a Local Computing Device and Cloud", 20 pages.
Office action for U.S. Appl. No. 13/314,512, mailed on Jul. 15, 2014, Hunt, et al., "Application Compatibility with Library Operating Systems", 29 pages.
Parno, et al., "Memoir Practical State Continuity for Protected Modules", Proceedings of the IEEE Symposium on Security and Privacy, May 2011, 16 pages.
Verizon Wireless, "Escaping from Microsoft Protected Mode Internet Explorer Evaluating a Potential Security Boundary", White Paper, Nov. 2011, 8 pages.
Extended European Search Report mailed Oct. 27, 2014 for European Patent Application No. 12752531.9, 9 pages.
Office action for U.S. Appl. No. 13/196,235, mailed on Mar. 17, 2015, Douceur et al., "Constraining Execution of Specified Device Drivers", 33 pages.
Office action for U.S. Appl. No. 13/323,465, mailed on Mar. 26, 2015, Baumann et al., "Cryptographic Certification of Secure Hosted Execution Environments", 27 pages.
European Office Action mailed May 27, 2015 for European patent application No. 12858489.3, a counterpart foreign application of U.S. Appl. No. 13/323,562, 5 pages.
Supplementary European Search Report mailed May 7, 2015 for European Patent Application No. 12858489.3, 3 pages.
Sahita, et al., "Beyond Ring-3: Fine Grained Application Sandboxing", W3C Workshop on Secutiy for Access to Device APIs from the Web, Dec. 2008, 5 pages.
Chinese Office Action mailed Aug. 21, 2015 for Chinese patent application No. 201210533610.9, a counterpart foreign application of U.S. Appl. No. 13/323,465, 9 pages.
Office action for U.S. Appl. No. 13/196,235, mailed on Sep. 22, 2015, Douceur et al., "Constraining Execution of Specified Device Drivers", 36 pages.
AWS CloudHSM, retrieved on Oct. 28, 2013, available at: http://aws.amazon.com/cloudhsm/, 5 pages.
International Search Report and Written Opinion for PCT Application PCT/US2015/038204 dated Sep. 4, 2015, 9 pages.
Karme, Anil, "Building YOURcloud: The Federal Government's first Secure Hybrid Community Cloud", retrieved on: Oct. 30, 2013, available at: http://www.govmarkcouncil.com/presentations/event112912/Anil_Karmel.pdf, RightPath, 39 pages.
Karthik, P, et al., "A Secure Access Code Technique for Remote Data Integrity on Public Cloud", International Journal of Computer Applications, vol. 77, Issue14, Sep. 2013, pp. 26-31.
Masti, et al.,"An Architecture for Concurrent Execution of Secure Environments in Clouds", In Proceedings of in the ACM Cloud Computing Security Workshop , Nov. 8, 2013, 12 pages.
McKeen, et al., "Innovative Instructions and Software Model for Isolated Execution" In Proceedings of the 2nd International Workshop on Hardware and Architectural Support for Security and Privacy, Jun. 24, 2013, 8 pages.
Office action for U.S. Appl. No. 13/215,244 , mailed on Oct. 1, 2015, Bond et al., "Migration of Cloud Applications Between a Local Computing Device and Cloud", 20 pages.
"Safenet Hardware Security Modules (HSMs)", Retrieved on Oct. 31, 2013, available at: http://www.safenet-inc.com/products/data-protection/hardware-security-modules-hsms/, 8 pages.
Sedayao, Jeff, "Enhancing Cloud Security Using Data Anonymization", In white Paper of Intel, Jun. 2012, 8 pages.
"Thoughts on Intel's upcoming Software Guard Extensions (Part 2)", published on: Sep. 23, 2013, available at: http://sec.soup.io/post/348921006/Thoughts-on-Intels-upcoming-Software-Guard-Extensions, 8 pages.
"What Is Apple's New Secure Enclave and Why Is It Important?", published on: Sep. 18, 2013, available at: http://www.forbes.com/sites/quora/2013/09/18/what-is-apples-new-secure-enclave-and-why-is-it-important/2/, 5 pages.
Chinese Office Action mailed Nov. 30, 2015 for Chinese patent application No. 201210537282.X, a counterpart foreign application of U.S. Appl. No. 13/323,562, 6 pages.

* cited by examiner

FIG. 5

FACILITATING SYSTEM SERVICE REQUEST INTERACTIONS FOR HARDWARE-PROTECTED APPLICATIONS

RELATED APPLICATIONS

The present application is related to U.S. patent application Ser. No. 13/323,465, filed concurrently.

BACKGROUND

Conventional software applications rely on various operating system functions. An operating system may provide a set of application programming interfaces (APIs) for providing basic computational services, such as thread scheduling, memory allocation, virtual memory, device access, and so forth. Additionally, an operating system may provide a rich feature set of APIs that provide additional operating system services such as graphical user interface (GUI) services, clipboard services, and the like.

Certain security-enabled processors are capable of providing a secure execution environment. Such security-enabled processors provide a protected memory space, and the security-enabled processors ensure that code and data stored in the protected memory space is inaccessible by code outside the protected memory space. The security-enabled processor provides well-defined exit and entry functions, hereafter referred to as gates, that permit execution to pass between code inside the protected memory space and code outside environment. The security-enabled processor does not allow access to input or output devices or kernel-mode execution within the protected memory space. As a result, the protected memory areas of security-enabled processors are too restrictive to run conventional software applications.

BRIEF SUMMARY

This Summary is provided in order to introduce simplified concepts of the present disclosure, which are further described below in the Detailed Description. This summary is not intended to identify essential features of the claimed subject matter, nor is it intended for use in determining the scope of the claimed subject matter.

An application executes inside a user-mode hardware-protected isolation container (UMHPIC) provided by a security-enabled processor. A library operating system executing within the UMHPIC as part of the application fulfills most operating system requests, including high-level requests. An UMHPIC-aware platform adaptation layer (U-PAL) enables applications with no special knowledge of the UMHPIC to execute inside the UMHPIC while utilizing operating system resources that reside outside of the UMHPIC. The U-PAL includes a secure services component that executes within the UMHPIC and ensures that thread scheduling, file system interactions, and resource allocations are handled properly on behalf of the application. The U-PAL includes a thunking component with a trusted portion that resides inside the UMHPIC and an untrusted portion that executes in user mode in the outside execution environment. The trusted thunking component passes system calls to the untrusted thunking component via an exit gate controlled by the security-enabled processor. The untrusted thunking component passes system call results from the operating system to the UMHPIC via an entry gate controlled by the security-enabled processor.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, conventional software applications rely on a rich feature set of operating system functions. Embodiments of the present application enable an application not written specifically to run within a secure execution environment (an unmodified application) to execute within a secure execution environment—hereinafter referred to as a user-mode hardware-protected isolation container (UMHPIC)—without trusting any code outside the secure execution environment. While code outside the UMHPIC, such a host operating system, may deny services to code inside the UMHPIC, code outside the UMHPIC cannot tamper with or snoop on the execution of code within the UMHPIC. Executing a conventional unmodified application within an UMHPIC might normally entail trusting the "host" operating system running outside the UMHPIC. An unmodified application normally trusts a host operating system for three reasons: first, conventional applications exploit rich and varied services from the operating system; second, an unmodified application is not configured to invoke the specific entry and exit gates of the security-enabled processor to enable execution and data to be passed between the UMHPIC and the outside execution environment; and third, the application relies upon the correct functioning of the operating system for its security. Embodiments of the present Detailed Description also enable a sandboxed environment, such as those described in U.S. application Ser. No. 12/834,895 ("ULTRA-LOW COST SANDBOXING FOR APPLICATION APPLIANCES"), to be executed within an UMHPIC.

Embodiments described in the present Detailed Description include an UMHPIC-aware platform adaptation layer (U-PAL) that resides partially inside an UMHPIC and partially in the outside execution environment. The U-PAL facilitates system resource request interactions between an application executing in the UMHPIC and a host platform executing outside of the UMHPIC. And, as part of the facilitating, one or more security-relevant actions are performed. The security-relevant actions, among other things, allow the application to utilize the host platform for access to resources even though the host platform executes outside of the UMHPIC, and is therefore "untrusted" code.

In embodiments, applications include a trusted library operating system inside their UMHPIC; most operating system requests are fulfilled by the library operating system, which invokes services of the U-PAL as needed; the U-PAL in turn invokes services from the host operating system. The trusted portion of the U-PAL (i.e., the portion that resides and executes inside the UMHPIC) presents a service interface to the application executing within the UMHPIC. The untrusted portion of the U-PAL (i.e., the portion that resides and executes in user mode outside of the UMHPIC) interfaces with the operating system, such as through a platform adaptation layer (PAL) provided by the host computer system.

The U-PAL includes a secure services component and a thunking component. The secure services component executes within the UMHPIC, and is therefore a "trusted" component from the perspective of the application. The secure services component verifies that all system services, including thread scheduling, file system interactions, and resource allocations are handled properly on behalf of the unmodified application thereby allowing for an untrusted host operating system. The thunking component includes both a trusted portion that resides inside the UMHPIC and an untrusted portion that executes in user mode outside of the UMHPIC. The thunking component provides the trusted portion of the U-PAL, including the secure services component, with access to host operating system functions that execute outside of the UMHPIC. The thunking component and the secure services component together allow an unmodified application, such as an application packaged with a library OS, to execute within an UMHPIC.

The processes, systems, and devices described herein may be implemented in a number of ways. Example implementations are provided below with reference to the following figures.

Example Environment for Executing an Unmodified Application in an UMHPIC

Figure 1:
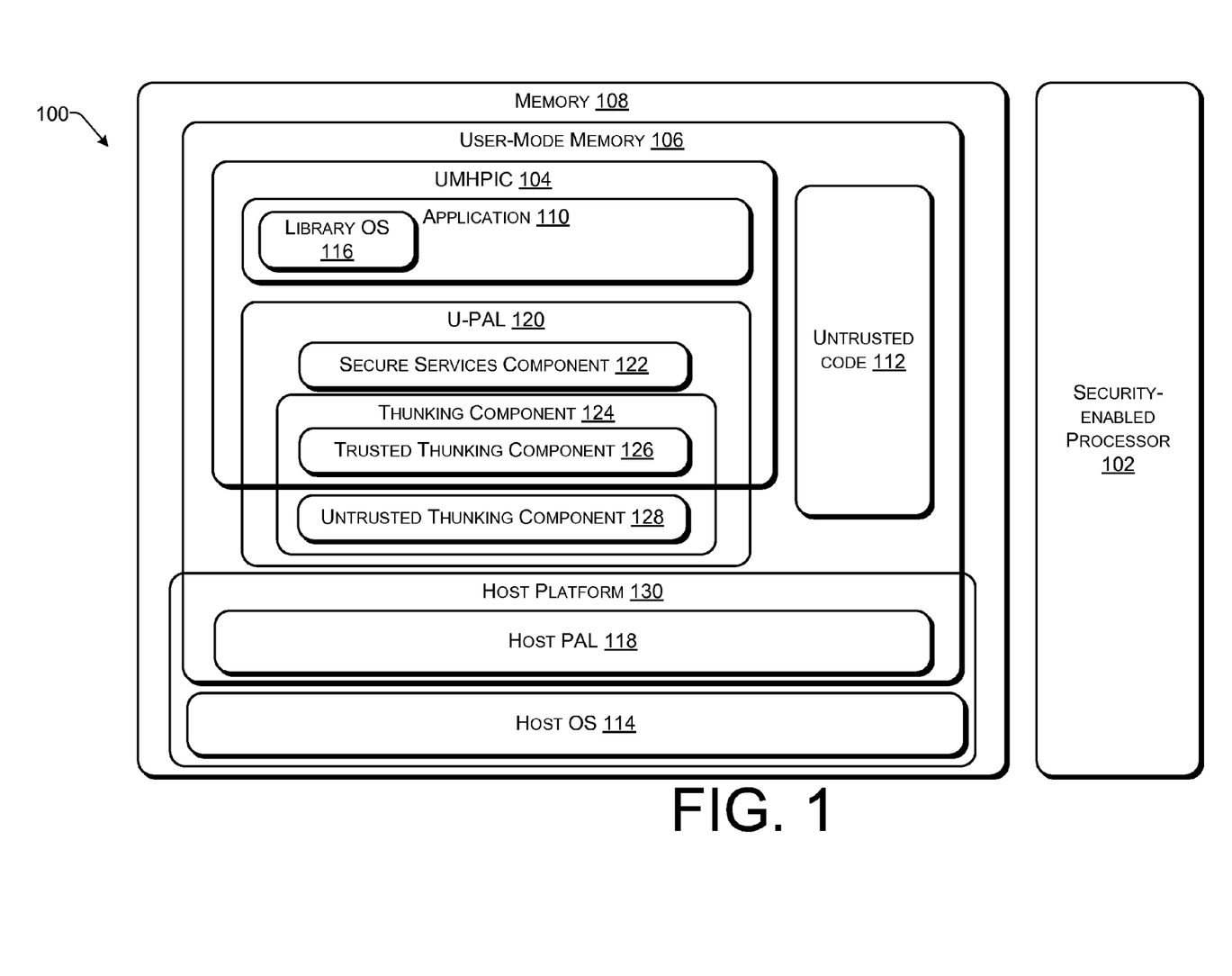
FIG. 1 is a schematic diagram of a secure execution environment for executing an application in an UMHPIC.

FIG. 1 is a schematic diagram of a secure execution environment for executing an application in an UMHPIC. Aspects of system 100 may be implemented on various suitable computing device types that are capable of implementing a secure execution environment for an unmodified application. Suitable computing device or devices may include, or be part of, one or more personal computers, servers, server farms, datacenters, special purpose computers, tablet computers, game consoles, smartphones, combinations of these, or any other computing device(s) capable of storing and executing all or part of a secure execution environment for executing an unmodified application.

System 100 includes a security-enabled processor 102 configured to instantiate a secure execution environment, including an UMHPIC 104. The UMHPIC 104 resides in a protected memory area within user-mode memory 106 or memory 108. Except through specific entry and exit gates provided by the security-enabled processor 102 that allow the code executing on the UMHPIC 104 to transfer execution and data in and out of the UMHPIC 104, the code and data stored in the UMHPIC 104 is inaccessible to code outside of the UMHPIC 104.

Threads exit the UMHPIC 104 to return to the unprotected memory through exit gates. Exit gates may be called directly, such as through a call instruction, or indirectly, such as through a processor exception. The UMHPIC 104 may be protected by encryption mechanisms; for example, the security-enabled processor 102 is configured to encrypt on write operations to the UMHPIC 104 and decrypt on read operations. Furthermore, the UMHPIC 104 can be tracked with a cryptographic hash (either inline or out of band) so that the security-enabled processor 102 can verify on read operations that the memory has not been altered. In other embodiments, the memory space that the UMHPIC 104 resides in might be on the same chip of the security-enabled processor 102, and the memory space may be segregated so that the security-enabled processor 102 can access it when execution enters an entry gate. In various embodiments, the security-enabled processor 102 may be implemented within a single chip, such as a system-on-chip (SOC), or it may be implemented across a processor and additional chipsets of system 100.

An application 110 executes within the UMHPIC 104. That is, the security-enabled processor 102 executes the application 110 in such a way that, except through well-defined entry and exit gates described in more detail below, prevents code executing outside of the UMHPIC 104, including untrusted code 112 or the host operating system (OS) 114, from tampering with or snooping on code or data inside the UMHPIC 104. For example, a thread executing code stored outside the UMHPIC 104 cannot access data stored in the UMHPIC 104. The security-enabled processor 102 might protect code and data within the UMHPIC for snooping or tampering through various techniques including, but not limited to, encrypting data as it leaves the processor, signing data to detect external tampering, blocking direct memory access (DMA) operations from I/O devices, separating caches, or using memory stored directly on the processor. This provides protection against untrusted code—that is, any code that runs outside of the UMHPIC 104—snooping on or tampering with contents of the UMHPIC 104.

Untrusted code 112 executes in user mode outside of the UMHPIC. The security-enabled processor 102 executes the untrusted code 112 in a way that prevents it from accessing code and data within the UMHPIC 104. Multiple UMHPICs are possible, and the security-enabled processor 102 may execute the untrusted code 112 in another UMHPIC. Even if executed in another UMHPIC, the untrusted code 112 is "untrusted" from the perspective of the UMHPIC 104. In some security-enabled processors, UMHPICs may be nested: an inner UMPHIC is protected from code in outer UMHPIC and all code outside the outer UMHPIC. In the case of nested UMHPICs, the code of the outer UMHPIC is untrusted by the inner UMHPIC; code and data of the inner UMHPIC cannot be tampered with or snooped on by code of the outer UMHPIC.

An initialization process—such as is described in related U.S. patent application Ser. No. 13/323,465, filed concurrently—may be used to initialize the UMHPIC 104 in a way that provides a client system with confidence that the UMHPIC 104 is established with the client's trusted code and data, and with no untrusted code or data, thereby providing the client system with confidence that the application 110 properly executes on system 100.

The UMHPIC 104 may be instantiated in the context of a hosted computing service, such as a "cloud computing" service, in which a client system initializes the UMHPIC 104 in order to execute the application 110 securely on the cloud computing service. Thus, from the perspective of the client system, all portions of system 100 outside of the UMHPIC 104 and the security-enabled processor 102 are "untrusted." Embodiments of the present application enable the application 110 to execute within the UMHPIC and still access operating system functions from an "untrusted" host operating system, such as the host OS 114.

In various embodiments, the application 110 includes one or more subcomponents. In common embodiments, one or more of the subcomponents of the application include a library operating system (OS) 116, which may be the same as or similar to the isolated OS subsystems described in U.S. patent application Ser. No. 12/834,895, filed Jul. 13, 2010 and entitled "ULTRA-LOW COST SANDBOXING FOR APPLICATION APPLIANCES. U.S. patent application Ser.

No. 12/834,895 describes "application sandboxes" configured to run various operating system elements (sometimes referred to as a "library OS") within an isolated application process separate from other elements of the operating system. The application sandboxes described in U.S. patent application Ser. No. 12/834,895, protect the host operating system from tampering or snooping by the application, but do not necessarily protect the application from tampering or snooping by the host operating system. The isolated OS subsystem described in U.S. patent application Ser. No. 12/834,895 provides an application with a rich set of APIs in order to directly provide operating system functions that the application is designed to use. The isolated OS subsystem also utilizes a small subset of application programming interfaces (APIs) to communicate with a host operating system, via an operating system platform adaptation layer (PAL), in order to provide the application with basic computation services. The Host PAL 118 may be the same as, or similar to, the host operating system PAL described in U.S. patent application Ser. No. 12/834,895. The host PAL 118 may in embodiments include a trap instruction. In alternative embodiments, the host PAL 118 includes libraries that create high-level abstractions from low-level host OS 114 abstractions. Collectively, the host PAL 118 (if present) and host OS 114 are included in a host platform 130.

The library OS 116 may be configured to provide the application 110 with a first subset of operating system services (such as, in one non-limiting example, the "rich" set of services described above), and to call the host OS 114 to provide the application 110 with a second subset of operating system services (such as, in one non-limiting example, the basic computational services described above). Embodiments of the present disclosure are not limited to executing applications, such as the application 110, that are packaged with a library OS such as library OS 116. The host PAL 118 and/or the library OS 116 are omitted in various embodiments. In at least one embodiment, the library OS 116 is omitted, and the application 110 consists of a user-mode processor emulator executing a virtual machine (which in turn may consist of a "guest" operating system and applications).

An UMHPIC-aware PAL (U-PAL) 120 resides partly within the UMHPIC 104, and partly in the untrusted portion of user-mode memory 106. In various embodiments, the application 110 may be unmodified for execution inside of the UMHPIC 104, and the application 110, in its unmodified version, is configured to interface directly with the host platform 130 via a service interface provided by the host platform 130. The U-PAL 120 therefore facilitates system resource request interactions between the application 110 executing in the UMHPIC and one or more components of a host platform 130 executing outside of the UMHPIC. And, a secure services component 122 of the U-PAL 120 performs one or more security-relevant actions. The U-PAL 120 provides the application 110 with a service interface, within the UMHPIC 104, that emulates the interface provided by the host platform 130. The portion of the U-PAL 120 that resides outside of the UMHPIC 104 is configured to interface with the host OS 114, such as through the host PAL 118 via a platform interface. In alternative embodiments, the host PAL 118 may be a subcomponent of the U-PAL 120. In still other embodiments, such as those that omit the library OS 116 and the host PAL 118, the U-PAL 120 emulates all or part of the service interface provided by the host OS 114. For example, the U-PAL 120 may provide a partial or full set of rich APIs that the application 110 is configured to use.

The U-PAL 120 includes the secure services component 122 and a thunking component 124. The secure services component 122 resides entirely within the UMHPIC 104 and performs the security-relevant actions. The secure services component performs security-relevant actions such as validating handles returned by the host platform, validating memory allocations, ensuring that thread scheduling adheres to expected semantics (e.g. mutual exclusion primitives indeed provide mutual exclusion), validating the results of various calls made to the host platform 130, updating data structures necessary for such validations, encrypting data, protecting the integrity of data by means of digital signatures or message authentication codes, protecting data from replay attacks, securely providing random numbers. The application 110 may be unmodified, and not designed to execute within the UMHPIC 104 on an untrusted computing system. Thus, the application 110 may have been developed with the assumption that the computing system on which it runs is trusted. Thus, the application 110 is not necessarily configured to validate that the host OS 114 behaves properly. But, because the computing system 100 may be untrusted from the perspective of the UMHPIC 104, the host platform 130 is not assumed to behave properly. Thus, the secure services component 122 performs security-relevant actions that result in a virtual platform that behaves in expected and proper ways.

In one non-limiting example, the secure services component 122 validates that interface handles returned by the host platform 130 in response to API calls for device access made by the application 110 and/or the library OS 116 are proper. For example, it may determine whether the interface handles are duplicates of interface handles previously provided to the application 110 and/or the library OS 116. Such interface handles may be used to access devices, such as I/O devices, networking devices, or other types of devices. In another non-limiting example, the secure services component 122 validates that memory allocations returned by the host platform 130 are proper. For example, it may ensure that a new memory allocation does not overlap with memory previously allocated to the application 110. Such overlapping memory allocation could cause the application 110 to unexpectedly overwrite its own data, thereby potentially causing it to behave in unpredictable ways.

In another non-limiting example, the secure services component 122 is configured to protect data to be written to a file on a file system of the host platform 130. This protection may include encryption, adding digital signatures or messages authentication codes and/or measures to protect against replay attacks, such as those described in U.S. Pat. No. 7,421,579, issued to England et al. on Sep. 2, 2008 and entitled "Multiplexing a secure counter to implement second level secure counters"; U.S. Pat. No. 7,065,607, issued to England et al. on Jun. 20, 2006 and entitled "System and method for implementing a counter"; and as described in "Memoir: Practical State Continuity for Protected Modules", by Bryan Parno, Jacob R. Lorch, John R. Douceur, James Mickens, and Jonathan M. McCune, and published in Proceedings of the IEEE Symposium on Security and Privacy, IEEE, May 2011. The application 110 itself may be configured to write data to a file system in an unprotected form because the application 110, as noted above, may be developed with the assumption that the computing system on which it runs is trusted. Thus, when the application 110 and/or the library OS 116 issue an API call to write data to the file system, the secure services component 122 protects the data on behalf of the application 110 before passing the protected data in a call to the host platform 130. The secure services component is also configured to unprotect and/or verify data read from the host platform, since the application 110 may not be configured to receive protected data from the file system and since it may not verify digital signatures or message authentication codes and may not check for replay attacks. In another embodiment, the secure services component 122 may implement all file system accesses using a protected virtual file system, possibly using encryption, digital signatures, message authentication codes and or measures to prevent replay attacks; avoiding the exposure of trusted file names and metadata to the host platform 130.

The application 110 may be configured to request thread scheduling services from the host platform 130. It would be possible, however, for an untrusted misbehaving host platform 130 to schedule threads in such a way as to cause the application 110 to execute incorrectly. For example, if one thread of the application 110 acquires a lock, a misbehaving operating system could allow another thread to concurrently acquire the same lock, thereby causing the threads to operate concurrently and leading to unpredictable results. Thus the secure services component 122 may include a user-mode thread scheduler configured to handle thread scheduling on behalf of the application 110 and/or the library OS 116. Such a user mode thread scheduler may not be required, for example, if the application 110 and the library OS 116 have only one thread of execution. If the application 110 and/or the library OS 116 invoke a call for host functionality related to thread scheduling, the secure services component 122 may determine to handle the thread scheduling call itself, rather than pass it to the host platform 130.

The thunking component 124 of the U-PAL 120 provides the ability to pass API calls from the secure services component 122 to the host platform 130. A trusted portion of the thunking component, the trusted thunking component 126, executes inside the UMHPIC 104 and is configured to marshal parameters associated with calls to the host platform 130, invoke an exit gate provided by the security-enabled processor 102, and to pass the marshaled parameters out to an untrusted thunking component 128. Thus, the trusted thunking component 126 acts as a transport for calls from the secure services component 122 to the host platform 130.

The trusted thunking component 126 also receives execution requests from the host platform 130 and results from the calls made to the host platform 130, via an entry gate invoked by the untrusted thunking component 128. The trusted thunking component 126 unmarshals the various parameters associated with those execution requests and results, and passes them to the secure services component 122 for validation.

The untrusted thunking component 128, also part of the thunking component 124, executes outside of the UMHPIC 104. It is configured to unmarshal the parameters passed to it by trusted thunking component 126 via the exit gate, and to make corresponding calls to the host platform 130 (such as invoking operating system calls to the host OS 114 through the host PAL 118) on behalf of the UMHPIC 104. The untrusted thunking component 128 receives from the host platform 130 execution requests and results from system calls, marshals the corresponding parameters for the execution requests and results, invokes an entry gate, and passes such marshaled components to the trusted thunking component 126. Thus, the untrusted thunking component 128 acts as an entry point for results of calls and execution requests from the host platform 130.

In a common embodiment, the untrusted thunking component 128 executes in user-mode outside of the UMHPIC 104, and may be invoked by the trusted thunking component 126 through an explicit exit gate. In an alternative embodiment, the untrusted thunking component 128 executes as a subcomponent of the host platform 130, and may be invoked from a system call or trap instruction issued within the trusted thunking component 126.

The thunking component 124 is configured to invoke the entry and exit functions of the security-enabled processor 102, thereby allowing it to pass parameters and execution between the UMHPIC 104 and the outside execution environment and vice versa. As noted elsewhere, the application 110 may be unmodified and may be unaware that it executes within the UMHPIC 104, and therefore may not be configured to invoke the exit gates of the security-enabled processor 102 in order to pass calls out to the host platform 130. Likewise, the host PAL 118 may also be unmodified to provide support for an application executing in the UMHPIC 104, and therefore may not be configured to invoke the entry gates of the security-enabled processor 102 in order to pass execution requests and the results from calls back to the application 110. Thus, the thunking component 124 provides the ability to invoke the entry and exit gates of the security-enabled processor 102 on behalf of the application 110 and the host PAL 118. The secure services component 122 provides the ability to handle thread execution, protect application data written to untrusted storage and validate host platform 130 behavior on behalf of the application 110 and takes the corresponding security-relevant actions. Together, the thunking component 124 and the secure services component 122 allow the application 110 to execute within the UMHPIC 104 while still making use of system resources provided by the "untrusted" host OS 114.

Example Computing Device for Providing a Secure Execution Environment

Figure 2:
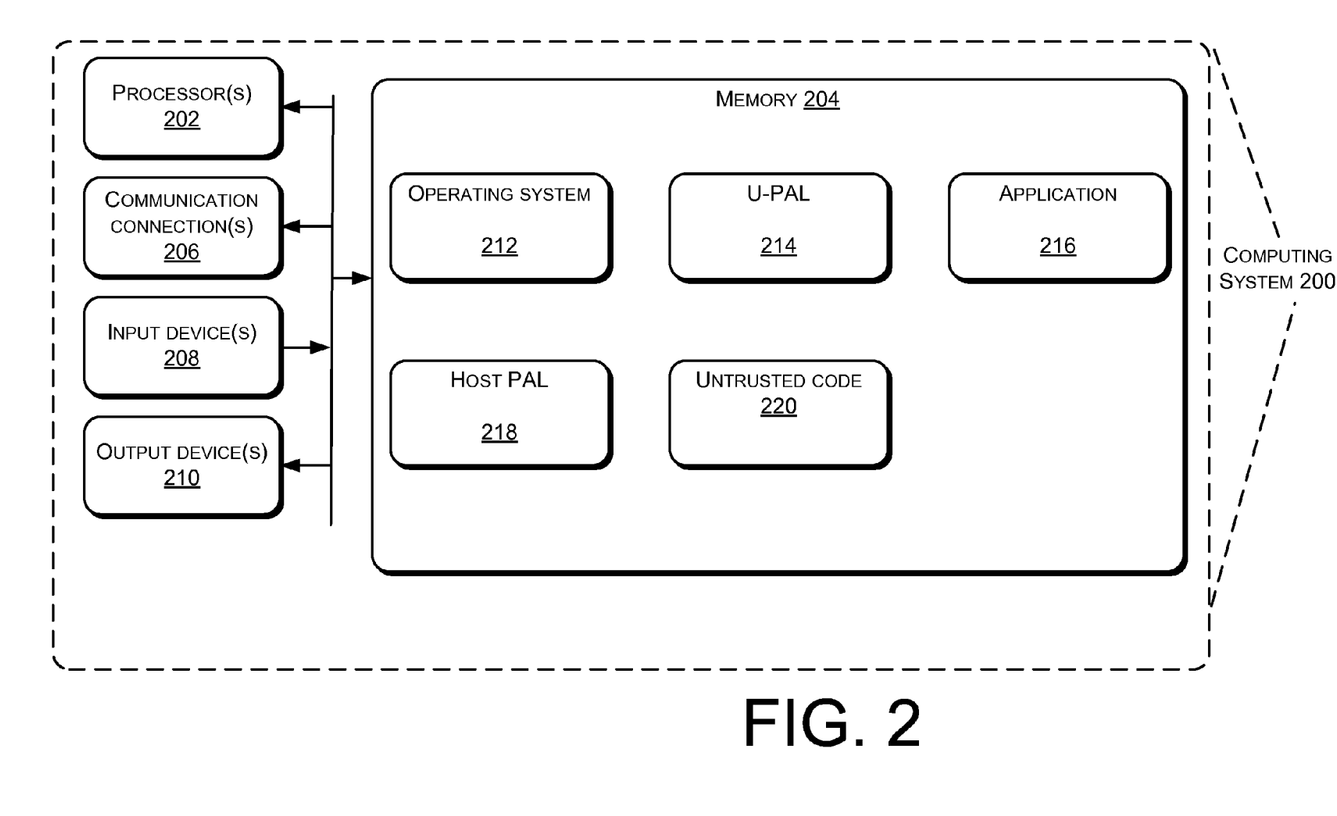
FIG. 2 is a block diagram of an example computing system usable to provide a secure execution environment according to embodiments.

FIG. 2 is a block diagram of an example computing system usable to provide a secure execution environment according to embodiments. The computing system 200 may be configured as any suitable computing device capable of implementing a secure execution environment. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of secure execution environment.

In one example configuration, the computing system 200 comprises one or more processors 202 and memory 204. The processors 202 include one or more security-enabled processors that are the same as or similar to security-enabled processor 102. The processors 202 may include one or more general-purpose or special-purpose processors other than a security-enabled processor. The computing system 200 may also contain communication connection(s) 206 that allow communications with various other systems. The computing system 200 may also include one or more input devices 208, such as a keyboard, mouse, pen, voice input device, touch input device, etc., and one or more output devices 210, such as a display, speakers, printer, etc. coupled communicatively to the processor(s) 202 and memory 204.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200. The operating system 212 may be the same as or similar to the host OS 114.

Portions of memory 204 may be included within an UMHPIC as is described elsewhere within this Detailed Description. Memory 204 may be divided between memory on the same physical chip as the processor and memory on other chips. Memory 204 includes a U-PAL 214, which may be the same as or similar to the U-PAL 120. Memory 204 includes an application 216, which may be the same as or similar to the application 110. The application 216 may include a library OS as described elsewhere within this Detailed Description configured to interface with a host PAL 218, which may be the same as or similar to the host PAL 118. Memory 204 includes untrusted code 220, which may be the same as or similar to untrusted code 112.

Example Operations for Execution of an Application in an UMHPIC

Figure 3:
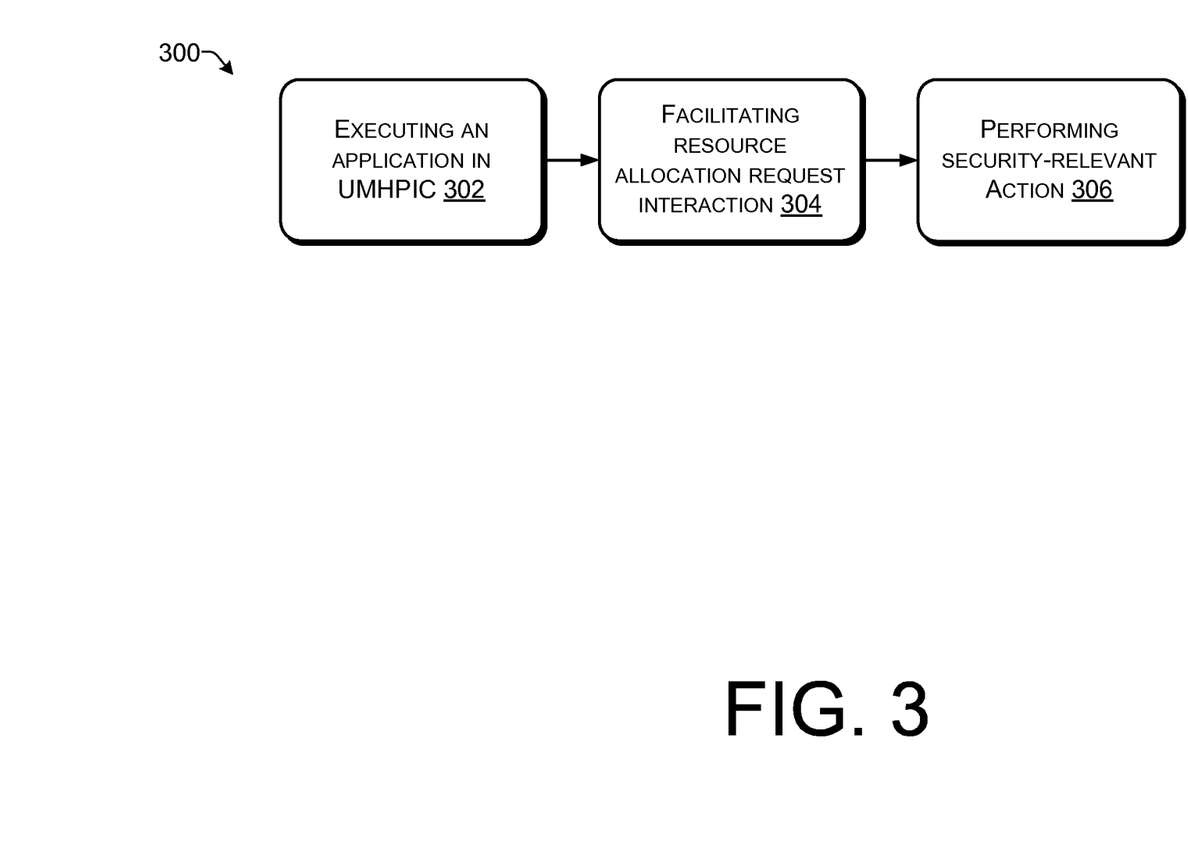
FIG. 3 is a flow diagram showing an example process for providing security to an application executing in an UMHPIC.

FIG. 3 is a flow diagram showing an example process 300 for providing security to an application, such as application 110, executing in an UMHPIC, such as UMHPIC 104. At 302, an application executes inside the UMHPIC, as is described elsewhere within this Detailed Description.

At 304, a U-PAL, such as U-PAL 120, facilitates a resource allocation request interaction between the application executing inside the UMHPIC and a host platform executing outside of the UMHPIC. The facilitating may include passing requests from the application, and results from the host platform, out of and into the UMHPIC, such as is described elsewhere within this Detailed Description. The facilitating may include invoking the entry and exit gates and marshaling parameters as are described elsewhere within this Detailed Description. The facilitating may include passing system resource requests to, and receiving associated results from, a host platform.

At 306, a secure services component of the U-PAL, such as the secure services component 122, performs, as part of the facilitating, a security-relevant action. The security-relevant action may include, in various embodiments, encrypting data from the application associated with the system service request interaction; decrypting data associated with the system service request interaction for the application; maintaining a bookkeeping data structure to store information regarding the system service request interaction; verifying the correctness of a resource allocation result that is provided by the host platform as part of the system service request interaction; checking for overlapping memory allocations; determining whether the device handle is a duplicate device handle; performing thread scheduling services, and so forth as described elsewhere within this Detailed Description. Other security-relevant actions may be performed without departing from the scope of the present disclosure.

Figure 4:
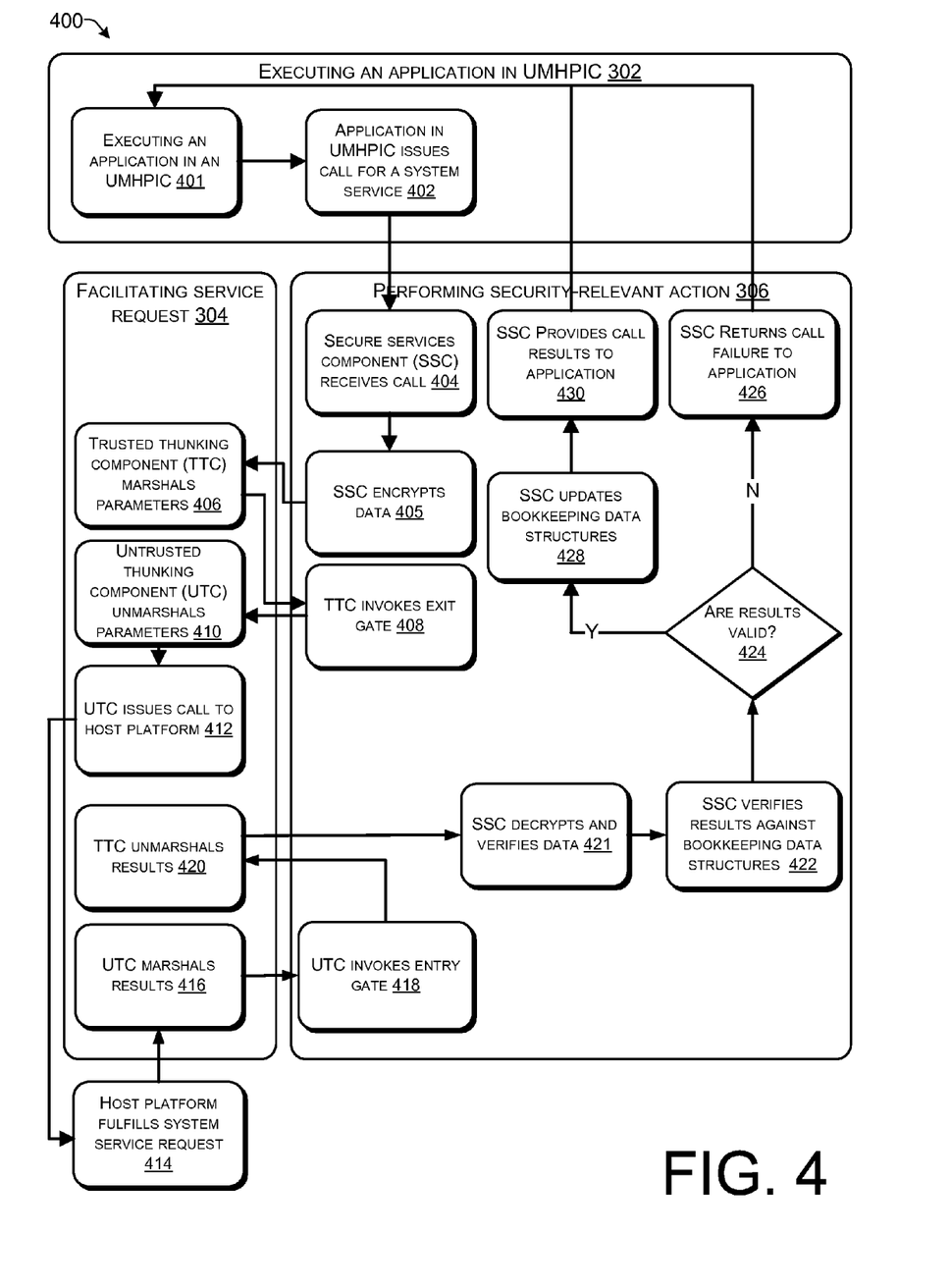
FIG. 4 is a flow diagram showing an example process for facilitating a resource request interaction between an application executing within an UMHPIC and a host platform executing outside of the UMHPIC.

FIG. 4 is a flow diagram showing an example process 400 for facilitating a resource request interaction between an application executing within an UMHPIC and a host platform, such as the host platform 130, executing outside of the UMHPIC. At 401, an application executes in the UMHPIC.

At 402, an application executing in an UMHPIC issues a call for a system service. The UMHPIC is provided by a security-enabled processor, such as the security-enabled processor 102. The security-enabled processor provides at least one exit gate for passing execution out of the UMHPIC and at least one entry gate for passing execution into the UMHPIC. The call may come from any subcomponent of the application including a library OS, such as the library OS 116, and the application and any subcomponents, including the library OS, may be unmodified to execute within the UMHPIC and may have no native capability to transfer execution outside of the UMHPIC.

At 404, a secure services component of a U-PAL, such as the secure services component 122 of the U-PAL 120, receives the call from the application. The secure services component executes within the UMHPIC.

At 405, the U-PAL may perform operations to cloak data in call parameters before they are sent to the host platform. For example, the U-PAL may encrypt data that will be written to persistent storage by the host platform.

At 406, a trusted thunking component of a U-PAL, such as the trusted thunking component 126 of the U-PAL 120, marshals the parameters of the call. For some parameters, such as for scalar values, the marshaling operation may be a null operation. For other parameters, the marshaling operation may be more complex. For example, if the call is one to write a buffer to disk, the trusted thunking component may allocate a temporary buffer in unprotected memory outside of the protected memory area, copy the contents from the buffer in the protected memory area to the temporary buffer in unprotected memory, and update the buffer pointer in the call parameters to point to the temporary buffer. In another example, a parameter may include a pointer-rich data structure, and the trusted thunking component may serialize it into a temporary buffer.

At 408, the trusted thunking component invokes an exit gate of the UMHPIC provided by the security-enabled processor to transfer execution to code of an untrusted thunking component, such as the untrusted thunking component 128 of the U-PAL 120, executing outside the UMHPIC.

At 410, the untrusted thunking component unmarshals the call parameters. For some parameters, such as for scalar values, the unmarshaling operation may be a null operation. For other parameters, the unmarshaling operation may be more complex. For example, the unmarshaling operation may deserialize a pointer-rich data structure. Various embodiments may include optimizations and/or extra coordination between an untrusted thunking component and a trusted thunking component to improve performance. Various optimizations for marshaling and unmarshaling may be used.

At 412, the untrusted thunking component issues the call to a host platform, such as the host platform 130. At 414, the host platform fulfills the system service requested.

At 416, when execution returns from the host platform to the untrusted thunking component, the untrusted component marshals the results of the call. For some results, such as for scalar values, the marshaling operation may be a null operation. For other results, the marshaling operation may be more complex. For example, the marshaling operation may serialize a pointer-rich data structure.

At 418, the untrusted thunking component invokes an entry gate of the UMHPIC provided by the security-enabled processor to transfer execution to code of the trusted thunking component executing inside the UMHPIC.

At 420, the trusted thunking component unmarshals the results of the call. For some results, such as for scalar values, the unmarshaling operation may be a null operation. For other results, the unmarshaling operation may be more complex. For example, if the call is one to read a buffer from disk, the trusted thunking component may copy the data from a temporary buffer in unprotected memory to a buffer in the protected memory area, and update the buffer pointer in the result parameters to point to the final buffer. In another example, a parameter may include a pointer-rich data structure, and the trusted thunking component may deserialize it.

At 421, the secure services component may decrypt data read from storage provided by the host platform and may also verify digital signatures or message authentication codes to verify the integrity of data. It may also perform verifications designed to protect against replay attacks. These steps may also be applied, for example, to virtual memory pages as they are read from page files on a hard disk. As noted elsewhere within this Detailed Description, the secure services component protects data written to the host storage system by the application executing in the UMHPIC. This is because the host platform and its storage services, including any file system provided by the host platform, are untrusted by applications executing in the UMHPIC. But the application itself may be unmodified to execute in the UMHPIC, and may therefore be configured to write data to a file system without protecting it. Thus, data read from the file system is decrypted and/or verified by the secure services component because the application is not configured to receive protected data, and may be unequipped to decrypt and verify it. In embodiments, the decryption step 421 may be combined with the unmarshaling step 420 as an optimization.

At 422, the secure services component verifies the returned results against bookkeeping data structures to verify that the results are consistent and trustworthy. In embodiments, the call might have been a request for a system resource or service, and the secure services component verifies that the result returned in response to the system request is valid for the requested resource or service. The system resource may be, in various embodiments, an allocated memory resource, a networking resource, an input/output resource, or other system resource.

The secure services component may utilize a bookkeeping data structure to verify output of any untrusted services from the host platform. For example, the bookkeeping data structure may enable the secure services component to validate that interface handles and memory allocations from the host platform are proper. In embodiments where the result is a resource or interface handle, the secure services component verifies that the returned resource or interface handle is not a duplicate of a previously provided resource handle in order to avoid handle replay attacks. In embodiments where the result is an indication of memory allocated to the application, the secure services component verifies that the allocated memory is not previously allocated to the application (which may cause the application to overwrite its own data and behave in unexpected ways), is accessible to the application, and does not lie within a reserved or invalid address range. In common embodiments, the bookkeeping data structures include structures for storing data related to one or more of memory allocations, resource handles, and thread identifiers.

At 424, if verification against bookkeeping data structures of the results of the call determines that the results are valid and therefore may be trusted, then execution proceeds.

At 426, if the result of the verification at 422 includes that one or more of the results are invalid, then the secure services component returns a failure result to the application. In some embodiments, the failure result is an error code relevant to that service request; for example, a well-known "disk read error" result on a disk read service request. In some embodiments, the failure may be delivered to the application as a catastrophic failure that causes the application to terminate immediately.

At 428, if the result of the verification at 422 includes that the results are valid, the secure services component updates the bookkeeping data structures as appropriate to the type of service request. For example, if the service request was to allocate a new region of memory, the secure services component may update a table of memory allocations; the secure services component may also issues instructions to the security-enabled processor to add the new region of memory to the protected memory area of the UMHPIC.

At 430, the secure services component provides the successful results of the call to the application, which continues its execution.

Figure 5:
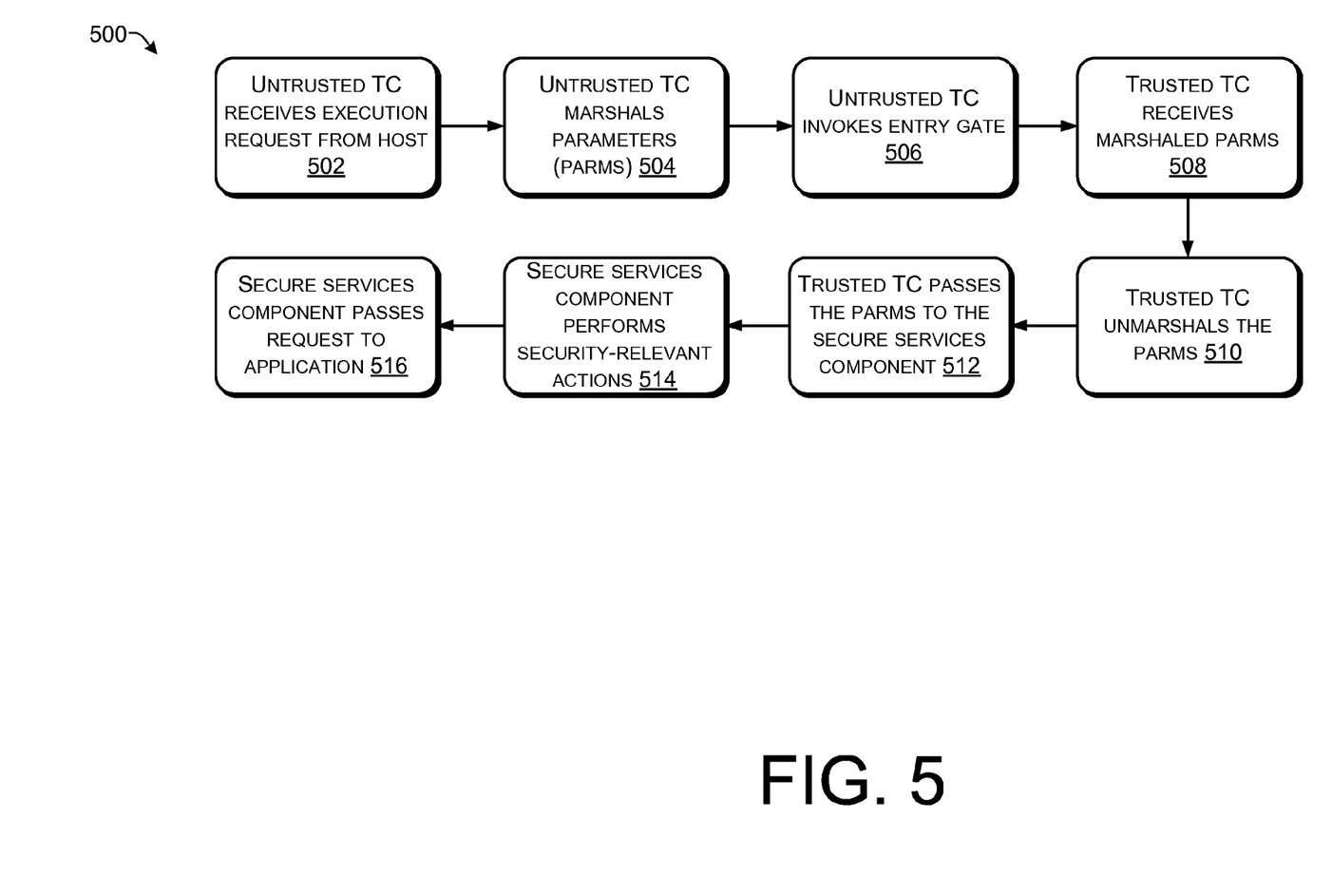
FIG. 5 is a flow diagram showing an example process for handling requests for execution and asynchronous notifications from a host platform.

FIG. 5 is a flow diagram showing an example process 500 for handling requests for execution and/or notifications of asynchronous events from a host platform, such as the host platform 130. At 502, an untrusted thunking component, such as the untrusted thunking component 128, receives an execution request or asynchronous notification from a host platform, such as the host OS 114 or host PAL 118. Various well-defined parameters accompany the requests and asynchronous notifications.

At 504, the untrusted thunking component marshals the parameters that accompany the requests and notifications. That is, the untrusted thunking component transforms the parameters to make them suitable for passing into an UMHPIC, such as the UMHPIC 104, via an entry gate to a process executing inside of the UMHPIC.

At 506, the untrusted thunking component invokes an entry gate provided by the security-enabled processor to pass the marshaled parameters associated with the requests and the notifications to the UMHPIC. And at 508, a trusted thunking component executing inside the UMHPIC, such as the trusted thunking component 126, receives the marshaled parameters via the entry gate.

At 510, the trusted thunking component unmarshals the parameters received from the untrusted thunking layer. Unmarshaling the parameters involves transforming the marshaled parameters to re-create the execution request or the asynchronous notification. At 512, the trusted thunking component passes the unmarshaled parameters to a secure services component executing inside the UMHPIC, such as the secure services component 122.

At 514, the secure services component performs security-relevant actions. These actions may include verifying that the execution request or asynchronous notification provided by the host platform is valid.

At 516, the secure services component passes the execution request or asynchronous notification to the application and/or a library OS executing in the UMHPIC.

FIGS. 3-5 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Computer-Readable Media

Depending on the configuration and type of computing device used, memory 204 of the computing system 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for computing system 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method comprising:
executing an application in a user-mode hardware-protected isolation container (UMHPIC), the UMHPIC protected by a security-enabled processor that provides at least an exit gate for passing execution out of the UMHPIC and an entry gate for returning execution into the UMHPIC;
facilitating, by an UMHPIC-aware platform adaptation layer executing within the UMHPIC, a system service request interaction between the application inside the UMHPIC and one or more untrusted components of a host platform executing outside of the UMHPIC; and
performing, by a secure services component of the UMHPIC-aware platform adaptation layer, a security-relevant action, wherein the security-relevant action facilitates the system service request interaction between the application inside the UMHPIC and the one or more untrusted components of the host platform executing outside of the UMHPIC.

2. The method of claim 1, wherein the security-relevant action includes encrypting data that is from the application and that is associated with the system service request interaction.

3. The method of claim 1, wherein the security-relevant action includes maintaining a bookkeeping data structure to store information regarding the system service request interaction.

4. The method of claim 1, wherein the security-relevant action includes decrypting data that is for the application and that is associated with the system service request interaction.

5. The method of claim 1, wherein the system service request interaction includes a request for allocation of resources, and wherein the security-relevant action includes verifying correctness of a resource allocation result that is provided by the host platform as part of the system service request interaction.

6. The method of claim 5, wherein the resource allocation result includes an indication of memory resources, and wherein the verifying the correctness of the resource allocation result includes checking for overlapping memory allocations.

7. The method of claim 1, wherein the security-relevant action includes performing thread scheduling services.

8. A system, comprising:
one or more processors including a security-enabled processor configured to provide at least an entry gate and an exit gate for passing execution to and from, respectively, a user-mode hardware-protected isolation container (UMHPIC);
memory including the UMHPIC; and
an UMHPIC-aware platform adaptation layer executable by the security-enabled processor, at least partially inside the UMHPIC, to facilitate a system service request interaction between an application executing within the UMHPIC and one or more untrusted components of a host platform executing outside of the UMHPIC, the UMHPIC-aware platform adaptation layer including:
a secure services component executable by the security-enabled processor inside the UMHPIC to perform a security-relevant action as part of the facilitation of the system service request interaction, wherein the security-relevant action facilitates the system service request interaction between the application executing within the UMHPIC and the one or more untrusted components of the host platform executing outside of the UMHPIC.

9. The system of claim 8, wherein the security-relevant action includes encryption of data that is from the application and that is associated with the system service request interaction.

10. The system of claim 8, wherein the UMHPIC-aware platform adaptation layer is configured to create a bookkeeping data structure within the UMHPIC, and wherein the security-relevant action includes maintenance of the bookkeeping data structure to store information regarding the system service request interaction.

11. The system of claim 8, wherein the security-relevant action includes decryption of data that is for the application and that is associated with the system service request interaction.

12. The system of claim 8, wherein the system service request interaction is a request for allocation of resources, and wherein the security-relevant action includes verification of the correctness of a resource allocation result that is provided by the host platform as part of the system service request interaction.

13. The system of claim 12, wherein the resource allocation result includes an indication of memory resources, and wherein the verification of the correctness of the resource allocation result includes a check for overlapping memory allocations.

14. The system of claim 8, wherein the security-relevant action includes performance of thread scheduling services.

15. The system of claim 8, wherein the UMHPIC-aware platform adaptation layer further includes a thunking component configured to marshal and unmarshal, as part of the facilitation of the system service request interaction, parameters associated with the system service request interaction.

16. Computer-readable storage device comprising a plurality of programming instructions executable by one or more processors of a computing device to cause the computing device to:
    facilitate a system resource request interaction between an application that executes within a user-mode hardware-protected isolation container (UMHPIC) and one or more untrusted components of a host platform that executes outside of the UMHPIC, the UMHPIC provided by a security-enabled processor that is configured to provide at least an exit gate for passing execution outside of the UMHPIC and an entry gate for passing execution into the UMHPIC; and
    perform, on behalf of the application as part of the facilitation of the system resource request interaction, a security-relevant action that facilitates the system resource request interaction between the application that executes within the UMHPIC and the one or more untrusted components of the host platform that executes outside of the UMHPIC.

17. Computer-readable storage device of claim 16, wherein the security-relevant action includes encryption of data that is from the application and that is associated with the system service request interaction.

18. Computer-readable storage device of claim 16, wherein the system service request interaction includes a request for allocation of resources, and wherein the security-relevant action includes verification of correctness of a resource allocation result that is provided by the host platform as part of the system service request interaction.

19. Computer-readable storage device of claim 18, wherein the resource allocation result includes an indication of memory resources, and wherein the verification of the correctness of the resource allocation result includes checking for overlapping memory allocations.

20. Computer-readable storage device of claim 18, wherein the resource allocation result includes a device handle, and wherein the verification of the correctness of the resource allocation result includes determining whether the device handle is a duplicate device handle.

* * * * *